US009785140B2

(12) United States Patent
Bayliss et al.

(10) Patent No.: US 9,785,140 B2
(45) Date of Patent: Oct. 10, 2017

(54) MULTI-PROTOCOL MULTI-CLIENT EQUIPMENT SERVER

(75) Inventors: Charles M. Bayliss, Cincinnati, OH (US); Raymond W. Ellis, Austin, TX (US); Toni Guckert, Austin, TX (US); Timothy Yoas, Austin, TX (US)

(73) Assignee: PEER Intellectual Property Inc., Kitchener, Ontario (CA)

( * ) Notice: Subject to any disclaimer, the term of this patent is extended or adjusted under 35 U.S.C. 154(b) by 961 days.

(21) Appl. No.: 11/340,101

(22) Filed: Jan. 26, 2006

(65) Prior Publication Data

US 2006/0277289 A1    Dec. 7, 2006

Related U.S. Application Data

(63) Continuation-in-part of application No. 09/496,009, filed on Feb. 1, 2000, now Pat. No. 8,028,049, and a
(Continued)

(51) Int. Cl.
    *G05B 19/418*    (2006.01)
    *H04L 29/08*    (2006.01)
    (Continued)

(52) U.S. Cl.
    CPC ......... *G05B 19/418* (2013.01); *G05B 19/042* (2013.01); *H04L 63/083* (2013.01);
    (Continued)

(58) Field of Classification Search
    USPC ........ 709/201–204, 219, 220–223, 230–231, 709/249–250, 200; 703/22; 700/1, 95,
    (Continued)

(56) References Cited

U.S. PATENT DOCUMENTS

| 4,698,766 A | 10/1987 | Entwistle et al. |
| 5,271,453 A | 12/1993 | Kato et al. |

(Continued)

FOREIGN PATENT DOCUMENTS

| EP | 0 620 631    | 3/1994 |
| EP | 0 612 004 A1 | 8/1994 |

(Continued)

OTHER PUBLICATIONS

Fan-Tien Cheng, Chun-Yen Teng—'An object-based controller for equipment communications in semiconductor manufacturing', 2002 Elsevier Science Ltd, Robotics and Computer Integrated Manufacturing 18 (2002) 387-402, accepted May 1, 2002.*

(Continued)

*Primary Examiner* — Greg C Bengzon
(74) *Attorney, Agent, or Firm* — Martine Penilla Group, LLP

(57) ABSTRACT

A method and apparatus are disclosed for improving the implementation of automated job management for equipment in a factory. A multi-protocol multi-client equipment server is provided for communicating with equipment and clients utilizing multiple protocols. The equipment server incorporates an object model of each tool and communicates directly in real-time with factory equipment. By providing a multi-protocol multi-client platform, data consumer clients are effectively decoupled from job management clients, allowing next generation station controllers for monitoring and controlling equipment processing to be easily implemented.

28 Claims, 28 Drawing Sheets

Related U.S. Application Data continuation-in-part of application No. 09/899,833, filed on Jul. 5, 2001, now Pat. No. 7,403,984, and a continuation-in-part of application No. 11/107,508, filed on Apr. 15, 2005, now Pat. No. 7,873,428.

(60) Provisional application No. 60/649,207, filed on Feb. 2, 2005, provisional application No. 60/649,754, filed on Feb. 2, 2005, provisional application No. 60/649,755, filed on Feb. 2, 2005, provisional application No. 60/649,756, filed on Feb. 2, 2005, provisional application No. 60/649,757, filed on Feb. 2, 2005, provisional application No. 60/649,758, filed on Feb. 2, 2005, provisional application No. 60/649,759, filed on Feb. 2, 2005, provisional application No. 60/649,763, filed on Feb. 2, 2005, provisional application No. 60/649,764, filed on Feb. 2, 2005, provisional application No. 60/649,765, filed on Feb. 2, 2005, provisional application No. 60/649,768, filed on Feb. 2, 2005, provisional application No. 60/649,898, filed on Feb. 2, 2005, provisional application No. 60/650,441, filed on Feb. 2, 2005.

(51) Int. Cl.
*H04L 29/06* (2006.01)
*G05B 19/042* (2006.01)

(52) U.S. Cl.
CPC .............. *H04L 67/12* (2013.01); *H04L 69/18* (2013.01); *G05B 2219/45031* (2013.01)

(58) Field of Classification Search
USPC .................. 700/121, 169; 718/100–102; 719/318–321, 324, 328, 313
See application file for complete search history.

(56) References Cited

U.S. PATENT DOCUMENTS

| | | | |
|---|---|---|---|
| 5,291,416 A | 3/1994 | Hutchins | |
| 5,367,624 A * | 11/1994 | Cooper | G06Q 10/06 715/734 |
| 5,432,702 A | 7/1995 | Barnett | |
| 5,453,933 A | 9/1995 | Wright et al. | |
| 5,592,600 A | 1/1997 | De Pauw et al. | |
| 5,805,442 A | 9/1998 | Crater et al. | |
| 5,826,040 A | 10/1998 | Fargher et al. | |
| 5,847,957 A | 12/1998 | Cohen et al. | |
| 5,987,135 A | 11/1999 | Johnson et al. | |
| 6,016,516 A | 1/2000 | Horikiri | |
| 6,021,331 A | 2/2000 | Cooper et al. | |
| 6,094,678 A | 7/2000 | Nethercott et al. | |
| 6,198,480 B1 | 3/2001 | Cotugno et al. | |
| 6,201,996 B1 | 3/2001 | Crater et al. | |
| 6,263,255 B1 * | 7/2001 | Tan | G05B 19/41845 700/106 |
| 6,332,163 B1 | 12/2001 | Bowman-Amuah | |
| 6,349,341 B1 | 2/2002 | Likes | |
| 6,370,448 B1 | 4/2002 | Eryurek | |
| 6,418,352 B1 | 7/2002 | Ellis et al. | |
| 6,421,682 B1 | 7/2002 | Craig et al. | |
| 6,463,352 B1 * | 10/2002 | Tadokoro et al. | 700/169 |
| 6,470,227 B1 * | 10/2002 | Rangachari et al. | 700/95 |
| 6,535,779 B1 | 3/2003 | Birang et al. | |
| 6,549,199 B1 | 4/2003 | Carter et al. | |
| 6,549,937 B1 | 4/2003 | Auerbach et al. | |
| 6,553,403 B1 | 4/2003 | Jarriel et al. | |
| 6,615,091 B1 | 9/2003 | Birchenough et al. | |
| 6,615,098 B1 * | 9/2003 | Bode | G05B 19/0426 700/116 |
| 6,618,425 B1 | 9/2003 | Carlesi et al. | |
| 6,629,002 B1 * | 9/2003 | Holder | 700/96 |
| 6,640,151 B1 | 10/2003 | Somekh et al. | |
| 6,658,571 B1 | 12/2003 | O'Brien et al. | |
| 6,681,145 B1 | 1/2004 | Greenwood et al. | |
| 6,684,122 B1 * | 1/2004 | Christian | G05B 19/41875 700/110 |
| 6,708,074 B1 * | 3/2004 | Chi | G05B 19/408 700/121 |
| 6,708,223 B1 | 3/2004 | Wang et al. | |
| 6,721,618 B2 * | 4/2004 | Baek et al. | 700/121 |
| 6,801,817 B1 * | 10/2004 | Bode | G05B 19/40937 700/115 |
| 6,832,120 B1 | 12/2004 | Frank et al. | |
| 6,871,112 B1 * | 3/2005 | Coss, Jr. | H01L 22/20 257/E21.525 |
| 6,944,584 B1 * | 9/2005 | Tenney et al. | 703/22 |
| 7,053,767 B2 | 5/2006 | Petite et al. | |
| 7,069,101 B1 * | 6/2006 | Arackaparambil et al. | 700/121 |
| 7,082,345 B2 * | 7/2006 | Shanmugasundram | B24B 37/042 257/E21.244 |
| 7,162,394 B2 * | 1/2007 | Cheng et al. | 702/184 |
| 7,317,959 B2 * | 1/2008 | Pfander et al. | 700/97 |
| 7,440,932 B2 * | 10/2008 | Gartland et al. | 706/46 |
| 7,698,012 B2 * | 4/2010 | Shanmugasundram | B24B 37/013 700/110 |
| 7,778,717 B2 * | 8/2010 | Bachman | G05B 19/41865 700/83 |
| 2002/0026514 A1 | 2/2002 | Ellis et al. | |
| 2002/0095644 A1 * | 7/2002 | Weiss | 716/3 |
| 2002/0156548 A1 * | 10/2002 | Arackaparambil | G05B 19/41845 700/108 |
| 2002/0161827 A1 * | 10/2002 | Brault | G05B 19/052 709/203 |
| 2003/0004601 A1 * | 1/2003 | Baek et al. | 700/121 |
| 2003/0083754 A1 * | 5/2003 | Tripathi | G05B 15/02 700/2 |
| 2003/0083756 A1 * | 5/2003 | Hsiung | G05B 15/02 700/28 |
| 2003/0134590 A1 | 7/2003 | Suda et al. | |
| 2003/0140310 A1 * | 7/2003 | Danz | G05B 19/042 715/237 |
| 2003/0208448 A1 * | 11/2003 | Perry | G05B 19/4183 705/64 |
| 2004/0019393 A1 * | 1/2004 | Heider | G05B 17/02 700/31 |
| 2004/0267399 A1 * | 12/2004 | Funk | G05B 19/41875 700/121 |
| 2005/0010931 A1 * | 1/2005 | Langkafel | G06F 9/541 719/328 |
| 2005/0022171 A1 * | 1/2005 | Langkafel | G06Q 10/06 717/136 |
| 2005/0165731 A1 * | 7/2005 | Funk | G05B 15/02 |
| 2005/0182507 A1 * | 8/2005 | Wu | H04L 69/08 700/121 |
| 2005/0187649 A1 * | 8/2005 | Funk | G05B 19/4184 700/121 |
| 2005/0198392 A1 * | 9/2005 | Yu | H04L 67/02 709/246 |
| 2005/0216579 A1 * | 9/2005 | Yang | H04L 41/0226 709/223 |
| 2005/0261796 A1 * | 11/2005 | Shen | H04L 45/00 700/121 |
| 2005/0262475 A1 * | 11/2005 | Halpern | G06F 8/71 717/114 |
| 2006/0026193 A1 * | 2/2006 | Hood | 707/102 |
| 2006/0042543 A1 * | 3/2006 | Funk | H01L 22/20 118/712 |
| 2006/0047356 A1 * | 3/2006 | Funk | G05B 19/41865 700/121 |
| 2006/0095545 A1 * | 5/2006 | Dreyer | H04L 67/34 709/220 |
| 2006/0259154 A1 * | 11/2006 | Hood et al. | 700/2 |
| 2008/0097621 A1 * | 4/2008 | Tasker et al. | 700/1 |

(56) References Cited

U.S. PATENT DOCUMENTS

FOREIGN PATENT DOCUMENTS

| EP | 0 747 795 | 6/1996 |
|---|---|---|
| EP | 0 822 473 A2 | 2/1998 |
| WO | WO 95/34866 | 12/1995 |
| WO | WO 01/57823 | 8/2001 |
| WO | WO 01/57823 A2 | 8/2001 |

OTHER PUBLICATIONS

Fan-Tien Cheng and Meng-Tsang Lin, Enhancement of Semiconductor Equipment Communications Using a Web-Enabled Equipment Driver,IEEE Transactions on Semiconductor Manufacturing, vol. 14, No. 4, Nov. 2001.*

Fan-Tien Cheng et al, 'Development of an Object-Based Equipment Controller for Semiconductor Equipment Communications', Industrial Electronics Society, 1999. IECON '99 Proceedings. The 25th Annual Conference of the IEEE, Nov. 29, 1999.*

Fan-Tien Cheng et al, Developing a Web-enabled Equipment Driver for Semiconductor Equipment Communications, Robotics and Automation, 2000. Proceedings. ICRA '00. IEEE International Conference , Apr. 24, 2000.*

Semi E5-0699; Semi Equipment Communication Standard 2 Message Content (SECS-II) (1999), pp. 1-240.

Semi E-37-0298; High-Speed SECS Message Services (HSMS) Generic Services (1998), pp. 1-24.

Semi E4-0699; Semi Equipment Communications Standard 1 Message Transfer (SECS-I) (1999), pp. 1-20.

Semi E30-0299; Generic Model for Communications and Control of Semi Equipment (GEM) (1992), pp. 1-76.

Shaopeng Wang et al: "Enabling robustness and flexibility of equipment data collection through SEMI EDA standards" Advanced Semiconductor Manufacturing, 2004 ASMC '04. IEEE Conference and Workshop Boston, MA, USA May 4-6, 2004, Piscataway, NJ, USA, IEEE, US, May 4, 2004, pp. 165-169, XP010768986; ISBN: 0-7803-8312-5; figures 1, 5; Sections "Common Equipment Model" and "Integration".

* cited by examiner

MULTI-PROTOCOL MULTI-CLIENT EQUIPMENT SERVER

CROSS REFERENCE TO RELATED APPLICATIONS

The present application is a continuation-in-part of U.S. application Ser. No. 09/496,009, filed Feb. 1, 2000, and a continuation-in-part of U.S. application Ser. No. 09/899,833, filed Jul. 5, 2001, and a continuation-in-part of U.S. application Ser. No. 11/107,508, filed Apr. 15, 2005, and claims priority to each of the following thirteen U.S. Provisional Application Ser. Nos. filed on Feb. 2, 2005: 60/649,207, 60/649,754, 60/649,755, 60/649,756, 60/649,757, 60/649,758, 60/649,759, 60/649,763, 60/649,764, 60/649,765, 60/649,768, 60/649,898, 60/650,441, all of the above applications herein incorporated by reference.

FIELD OF THE INVENTION

The present invention relates to the field of automated job management, and in particular the monitoring and control of equipment processing in a semiconductor fabrication facility.

BACKGROUND

Semiconductor chip manufacturing does not typically enjoy the high level of automation that other technology sectors do. In various areas of a semiconductor chip manufacturing factory, the systems and tools are often only semi-integrated or even completely independent. Furthermore, because of the proprietary communication protocols that are typically used, it is often very difficult to automate the manufacturing process in a way that not only coordinates the activity between the tools, but also collects data from the tools in a fashion that is usable for process improvements and other job management functions.

FIG. 1 illustrates a prior art approach to equipment management. Factory manufacturing execution system (MES) 110 is connected to semiconductor manufacturing equipment 120, running Tool Control Software 130. This traditional approach to managing equipment via computer integrated manufacturing technologies relies on the twenty-year-old Semiconductor Equipment Communication Standard (SECS) communication standards of the Semiconductor Equipment and Materials International (SEMI) organization. These standards define a serial point-to-point communication interface and a messaging system for the exchange of information between semiconductor manufacturing equipment 120 and MES 110. To comply with these standards, tool vendors typically supply SECS or SECS/GEM-compliant interface 140 and Tool Control Software 130 to enable factory personnel to connect the tool to MES host 110.

As tools have become increasingly complex, there has been a need for more information about the capabilities and structure of the tools than the SECS messaging system and interface typically provides. Some of the specific limitations of the SECS interface include the following.

1. Undiscoverable interfaces: the MES cannot query the interface to determine its capabilities. Tool drivers have been developed to supply the MES with configuration information not available through the SECS interface.

2. Undiscoverable physical structures: SECS messages do not reveal the physical structure of a tool. This prevents the development of generic factory systems for important tasks such as remote status display and remote diagnostics.

3. Single client: The SECS cable connecting the tool to the MES is a point-to-point link. Only one software process from the MES can access the tool, making it impossible for multiple client applications to access the tool.

4. Lack of a security mechanism: SECS has no provision for client authentication or access permissions. If multiple clients, especially those external to the MES, can access the tool, security control must be available.

As an alternative to the configuration illustrated in FIG. 1, factory automation engineers have developed configurations, exemplified by FIG. 2, in which tools are grouped together and loosely controlled by a monolithic software program known as a "station controller." Station Controller 250 communicates with either an individual tool or a group of tools using the SECS/GEM interface. Factory MES 210 is connected to Station Controller 250, which is in turn connected to semiconductor manufacturing equipment 220, running Tool Control Software 230.

The job of Station Controller 250 is twofold. First, Station Controller 250 presents MES 210 with a more convenient view of the tool than possible using the SECS interface. Second, Station Controller 250 can add several capabilities to the tool, such as process job setup and recipe control.

Unfortunately, current software architectures implementing station controllers have severe restrictions, in particular with respect to integration among semiconductor manufacturing tools and the way that data about tool actions and status is handled. In particular, there is often a need for the equipment to provide real-time data directly from the tools to other software applications for the purpose of manufacturing process analysis, diagnosis, and quickly implemented corrective actions. To support this requirement, the current software architectures used to integrate and extract data from the tools has many design impediments to overcome. Primarily, current architectures implementing station controllers have not overcome the limitations stated above with the SECS/GEM interface.

Another fundamental problem present in current station controllers is higher complexity as a result from a drift from the primary function of controlling material processing. As multiple functions have been incorporated on top of core job management needs, large and complex software architectures have been created that are not easily adaptable to change. This also results in a single point of failure with multiple internal failure points and a high cost of ownership. Because data collection has typically been integrated with job management, current station controllers have become the sole collectors of equipment data, requiring data consumers to interface through the station controllers.

The changes in the semiconductor industry that have mandated that semiconductor manufactures implement efficient automation integration strategies is primarily attributed to the resulting exponential increase in manufacturing data that must be managed as circuit capacity increase with 300 mm wafers and beyond, in parallel with reductions in geometry size which are now focused on 45 nm and below. In addition to the above drivers for change, several other pressures are magnifying the need for change. First, a need exists to focus a small number of expert resources on solving issues, and to reduce the resources spent on merely finding data. Also, the high cost of mis-processing wafers at 45 nm, where each wafer consists of 100's to 1000's of die, has made the need for efficient solutions more acute. There are also performance issues that are driving the need for efficient solutions, such as the high cost of equipment downtime and the desire to improve overall equipment effectiveness (OEE). There is also a need for real-time data to allow faster response to processing issues and a need to improve the tool to production time.

Current solutions will not solve the data access requirements for applications such as e-Diagnostics and Advanced Process Control (APC) that require the ability for automation architectures to support concurrent multi-client access to equipment and independent of the current ownership of equipment processing control. The ability to implement "data on demand" is a driving factor in the next generation of semiconductor focused station controller architectures. As the industry moves from lot based to wafer level manufacturing, automation solutions will need to be able to provide advanced statistical process control (SPC), fault detection classification and run-to-run control applications required to make effective manufacturing and business decisions to meet the demands of their customers.

For the reasons stated above, the typical station controller has become an impediment. Where once the station controller was designed to specifically control management of manufacturing jobs, now the station controller has evolved into an intricately intertwined set of programs whose functions have expanded as much as its complexity. This complexity makes maintenance or changes to the station controller, as well as to its fundamental functions such as job management, very difficult, time consuming and expensive. In some cases the overlapping and intertwined nature of the software code makes factory managers very hesitant to make any changes, even if they would result in manufacturing process improvements that are required in order to increase the output yields of operating semiconductor chips.

New standards, such as SEMI E120, Specification for the Common Equipment Model (CEM) are evolving that provide standard equipment object models. CEM can be used as a guide to allow the development of object models that represent the external view of a tool to be used by other factory equipment. Standards such as CEM represent an opportunity to use an industry-standard object-oriented tool interface, but current station controller architectures are unable to take advantage of these new standards.

What is needed is a method to overcome the limitations of the SECS or SECS/GEM interfaces, eliminate the need for costly station controllers, and take advantage of the CEM object model.

BRIEF SUMMARY OF THE INVENTION

The present invention solves the limitations described above by creating a multi-protocol multi-client equipment server based around an equipment model framework. The present invention serves as an intermediary between the equipment and Factory MES and other client software that communicates with the equipment. The present invention can be operated in a legacy mode, in which current MES and SECS/GEM interfaces are supported, while easing the transition to modern protocols for the equipment and MES systems.

One aspect of the present invention incorporates a software tool with a graphical user interface allowing for the convenient creation and validation of an equipment model to be used by the equipment server.

DETAILED DESCRIPTION

Figure 1:
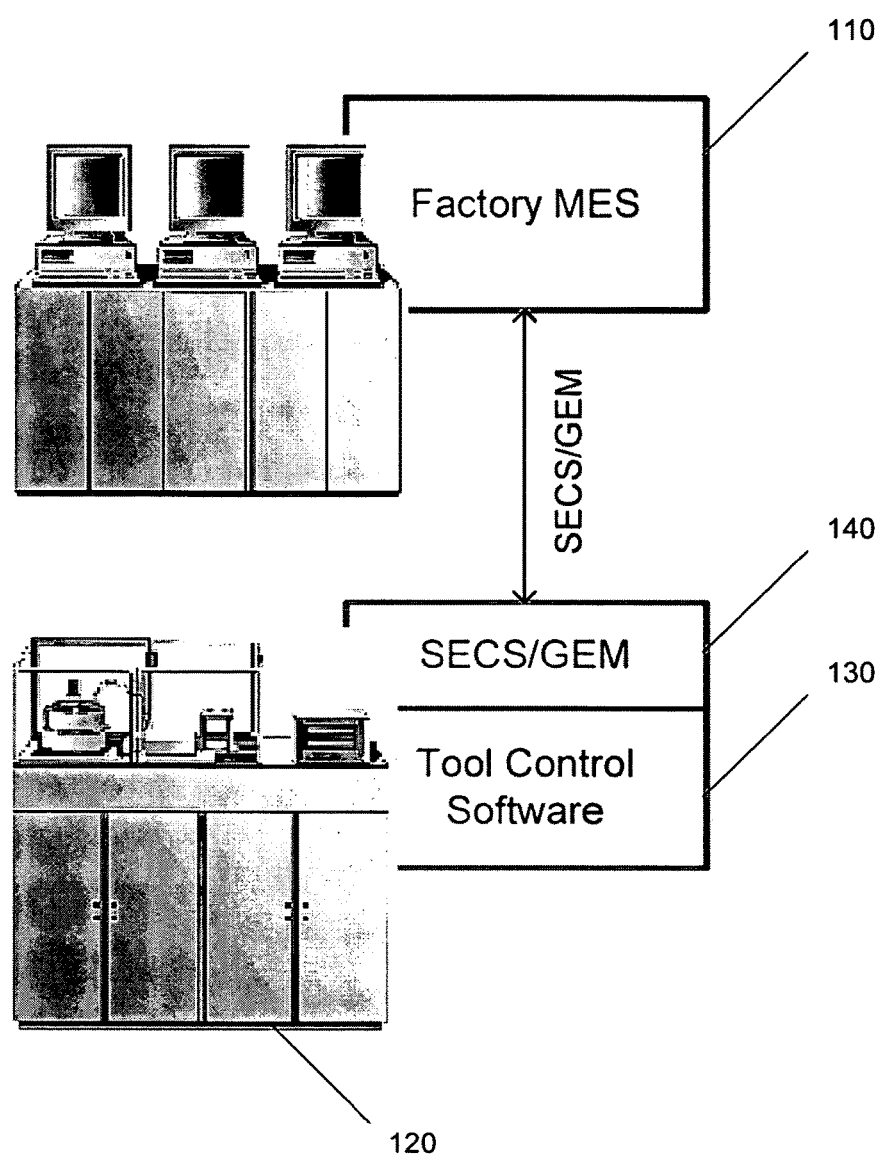
FIG. 1 illustrates a prior art approach to managing equipment via computer integrated manufacturing technologies.
Figure 2:
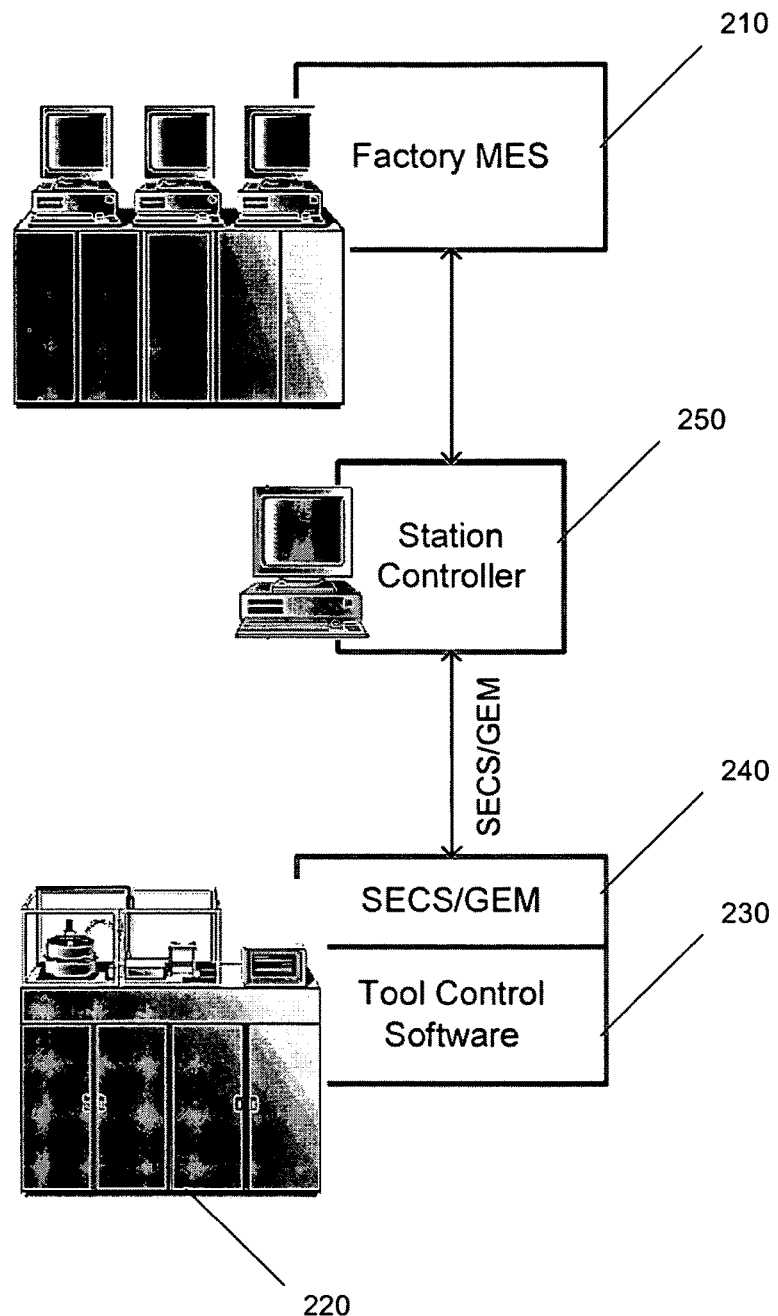
FIG. 2 illustrates an alternative prior art approach to managing equipment incorporating a station controller.

The equipment server of the present invention gives front end and back end fabs up-to-date, real-time data by implementing equipment models that allow concurrent access to equipment information. The equipment server offers an object model capable of representing the physical structure of a tool, as well as its behavioral characteristics. It supports multiple simultaneous connections, multiple communication interface types—multiple protocols—and includes a framework for adding additional standard and non-standard interfaces. Configuration of the tool model and all communication interfaces is performed with a XML configuration, allowing complete flexibility.

The equipment server of the present invention is flexible and adapts to existing automation solutions, both front and back-ends, including assembly and test. Integration with traditional station controllers and non-SECS equipment is supported, where access to information is still critical but time consuming and often collected manually. Additionally, multiple commercial communication protocols are supported, providing flexible integration, low cost and risk-free implementation.

The present invention provides the means to implement the CEM standard on semiconductor tools. The present invention provides a library of hierarchical generic classes based on the CEM standard that can be used to create an object model of a semiconductor manufacturing tool. Through the addition of object-oriented communications technologies, such as DCOM and .NET, the present invention extends the object model to enable multiple client programs, both internal and external to the factory, to simultaneously communicate with the tool. This enables factory users to take advantage of tool information to improve productivity and various third parties, such as tool vendors, to provide remote diagnostic support via the World Wide Web. The present invention also includes a set of SECS/GEM interfaces to ease migration from legacy applications to distributed object interface technologies.

Through extension of the CEM model with state-of-the-art object-based communications technologies, such as DCOM, .NET and HTTP/SOAP, the present invention enables the migration of applications from limited SECS/GEM-based architectures to robust applications built on industry standards that enable inter operability between solution providers.

The following SEMI standards are relevant to the present invention and are herein incorporated by reference. The description of each is excerpted from its associated standard.

SEMI E4-0699: SEMI Equipment Communications Standard 1 Message Transfer (SECS-I). Defines a communication interface suitable for the exchange of messages between semiconductor processing equipment and a host (Section 1.2, June 1999).

SEMI E5-0301: SEMI Equipment Communications Standard 2 Message Content (SECS-II). Defines the details of the interpretation of messages exchanged between intelligent equipment and a host (Section 1.1, March 2001). A preferred embodiment of the present invention supports a subset of the messages defined in SEMI E5. The format for these messages is described in SEMI E5. Default variable and event IDs for the variables and events internal to the equipment server are established. These values may be changed for a specific tool implementation. The tool implementor should provide a separate manual describing the variables and events for that tool.

SEMI E30-1000: Generic Model for Communications and Control of Manufacturing Equipment (GEM). The scope of the GEM standard is limited to defining the behavior of semiconductor equipment as viewed through a communications link. The SEMI E5 (SECS-II) standard provides the definition of messages and related data items exchanged between host and equipment. The GEM standard defines which SECS-II messages should be used, in what situations, and what the resulting activity should be. (Section 1.2, October 2000).

SEMI E37-0298: High-Speed SECS Message Services (HSMS) Generic Services. HSMS defines a communication interface suitable for the exchange of messages between computers in a semiconductor factory. HSMS is intended as an alternative to SEMI E4 (SECS-I) for applications where higher speed communication is needed or when a simple point-to-point topology is insufficient. HSMS is also intended as an alternative to SEMI E13(SECS Message Services) for applications where TCP/IP is preferred over OSI. (Sections 1 and 2, February 1998).

SEMI E37.1-96E: High-Speed SECS Message Services Single-Session Mode (HSMS-SS). A subsidiary standard to High-Speed SECS Message Services (HSMS) Generic Services. The purpose of this standard is to explicitly limit the capabilities of the HSMS Generic Services to the minimum necessary for this type of application.(Sections 2 and 5, August 1999).

SEMI 3570: XML Semiconductor Common Components

SEMI 3851: Representation of Measurement Units in XML

SEMI E125 and E125.1: Equipment Self Description

SEMI E132 and E321.1: Authentication and Authorization

SEMI E134 and E134.1: Data Collection Management

Figure 3:
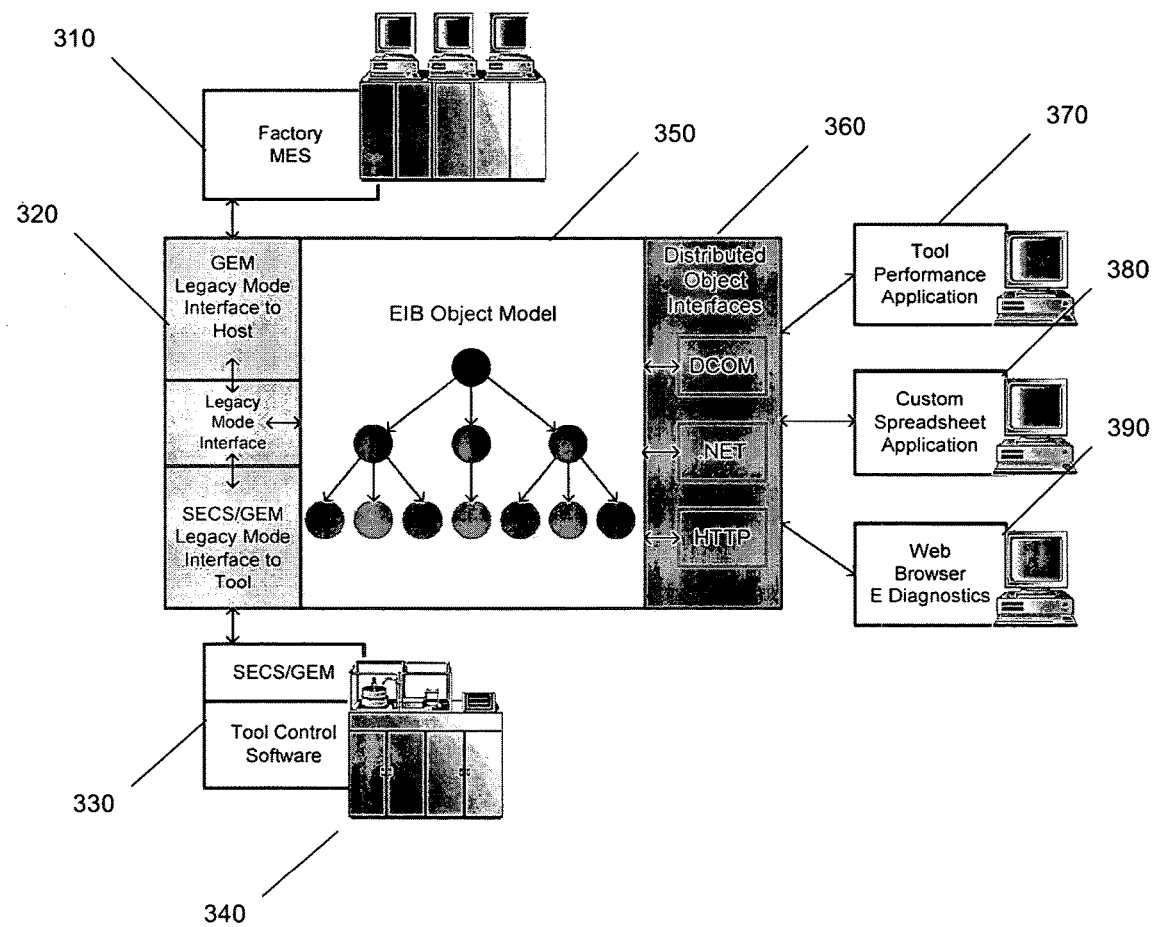
FIG. 3 illustrates an embodiment of the present invention operated in a legacy mode.

FIG. 3 illustrates an embodiment of the present invention in a legacy mode. Factory MES 310 communicates with Legacy Mode Interfaces 320 on the equipment server. The equipment server also communicates using the Legacy Mode Interfaces 320 to equipment 340 running Tool Control Software 330. Legacy Mode Interfaces 320 incoporate a GEM Legacy Mode Interface to the Factory MES 310, a Legacy Mode Interface to Equipment Object Model 350 and a SECS/GEM Legacy Mode Interface to equipment 340. Equipment Object Model 350 is a hierarchical model of the equipment based on the CEM standard. Additional interaction between the equipment and other clients is supported by the equipment server through Distributed Object Interfaces 360, which incorporate DCOM, .NET and HTTP interfaces. Clients such as a Tool Performance Application 370, a Custom Spreadsheet Application 380 or a Web Brower E-Diagnostics 390 communicate through Distributed Object Interfaces 360 to the equipment server.

The legacy mode of the present invention is designed to provide a legacy GEM interface to a process tool regardless of the interface provided by the tool manufacturer. This allows the factory to establish a GEM connection to the equipment server, which in turn establishes a connection to the process tool using a legacy SECS or GEM implementation. While this feature allows all tools to appear similar and eases cell controller development, it increases the complexity of deploying the present invention into existing legacy systems. The Legacy Mode tool interface provides a short-term solution to address this problem.

The Legacy Mode the deployment in a facility without modifying existing cell controllers. In this mode, the present invention functions as a data collection system. The Legacy Mode allows all messages from the host to pass to the tool unmodified and return in the same condition, while performing data collection and providing an object model of the tool. This mode is intended as an intermediate deployment solution until legacy systems can be enhanced to utilize the advantages of a full implementation.

Figure 4:
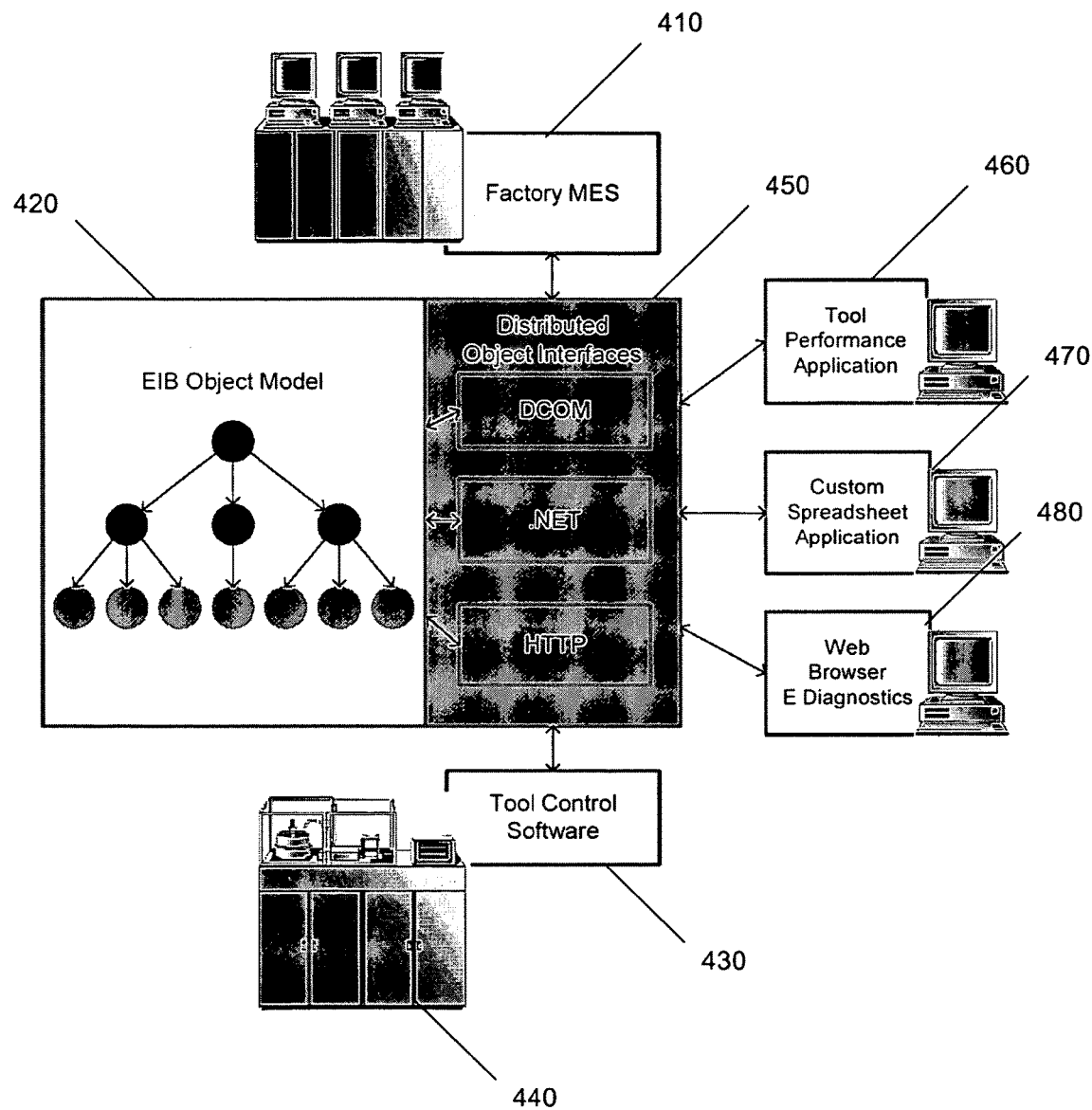
FIG. 4 illustrates an embodiment of the present invention operated in a native mode.

FIG. 4 illustrates an embodiment of the present invention in a non-legacy or native mode. In this embodiment, the legacy mode features of the equipment server are not used and instead Factory MES 410 communicates directly with the distributed object interfaces 450 of the equipment server and these interfaces are also used to communicate with Tool Control Software 430 running on equipment 440. The equipment server utilizes an equipment model 420 which is a hierarchical model of the equipment based on the CEM standard. As in the legacy mode, other clients such as a Tool Performance Application 460, a Custom Spreadsheet Application 470 or a Web Brower E-Diagnostics 480 communicate through Distributed Object Interfaces 450 to the equipment server.

Figure 5:
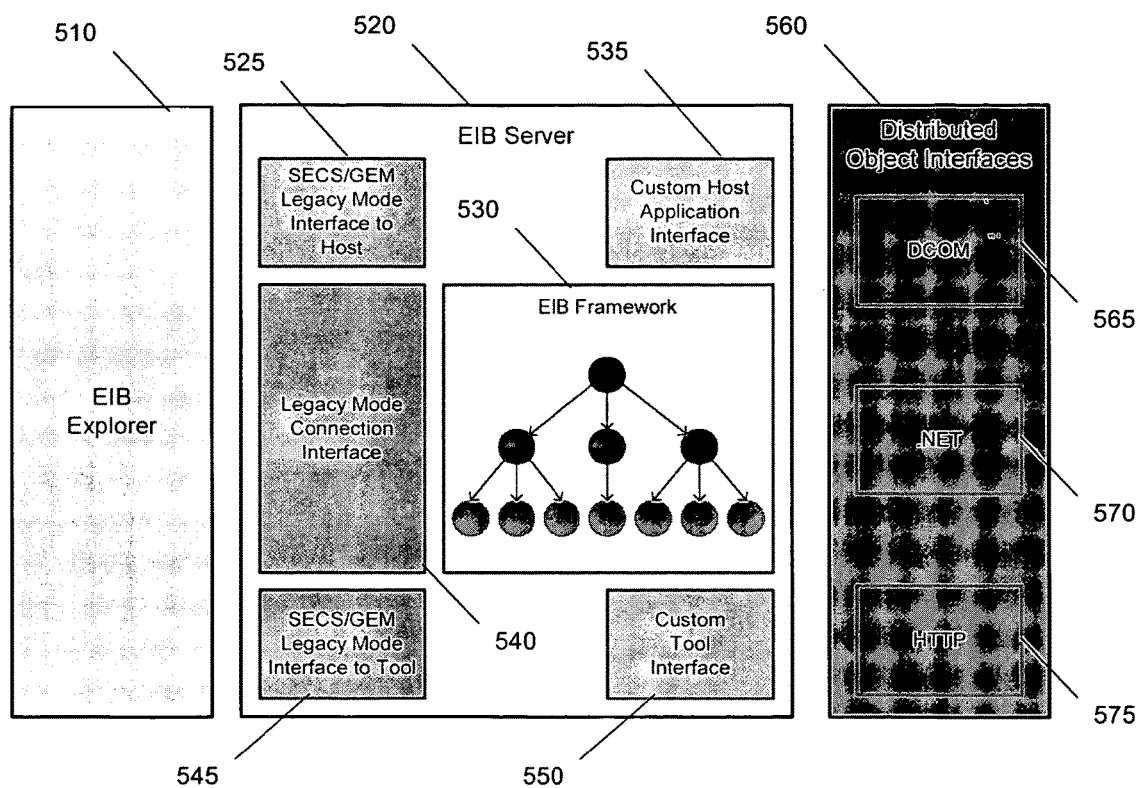
FIG. 5 illustrates software components of an embodiment of the present invention.

More detail on the internal components of the equipment server of the present invention is illustrated in FIG. 5. Distributed object interfaces 560 are used to communicate between the server 520 and client programs, both internal and external to the factory, such as illustrated in FIGS. 3 and 4. DCOM 565, .NET 570, and HTTP 575 interfaces are supported in a preferred embodiment of the invention. Communication with equipment utilizes either SECS/GEM Legacy Mode Interface 545 or Custom Tool Interface 550. Communication with a Factory MES host utilizes wither SECS/GEM Legacy Mode Interface 525 or Custom Host Application Interface 535 as explained above. Legacy Mode Connection Interface 540 is used to connect the host with the equipment in Legacy Mode. EIB Framework 530 incorporates a library of hierarchical, generic classes based on the CEM standard. This library is utilized to create object model instances for each tool in the factory. EIB Explorer 510 is a program that acts as a tool browser displaying the objects and attributes for a particular tool. EIB Explorer 510 also allows the values of attributes to be changed for testing or debugging purposes.

Object Model

The present invention utilizes object models of each semiconductor manufacturing tool. An object model functions much like a hierarchical data model, revealing information about the objects that reflect the structure and operation of the equipment. Client programs can communicate with the model in several ways. By exchanging synchronous messages, data values can be retrieved or altered. This process can be used to perform the following:

1. Query the model to discover the physical or logical make-up of the tool.

2. Query the model to find out what states the tool or its components are in, for example: in service, out of service, idle, active, or inactive.

3. Direct an object to perform a specific function owned by, the object and accessible to the user, for example, change the object's state when all or part of the tool must be taken out of service for maintenance, or read an added I/O device.

Communication between client programs and tools can also take place through asynchronous callbacks, where client programs receive notifications from the objects when certain events occur within the tool, for example, when a state or data value changes.

From the perspective of applications external to the equipment server of the present invention, objects take one of three forms. These are: Nameable Objects, Service Objects and Internal Objects.

A Nameable object is an object based on the SEMI E120 Common Equipment Model Nameable object. A Nameable object is an object that implements all the requirements of the CEM Nameable class. For accessing objects, the important element of a Nameable is the object has a name that uniquely identifies the object within all owners of the object and the object may be retrieved from each of the owners. Additionally, the Nameable has a set of locators that uniquely identify the object within the model, one through each owner of the object. These objects appear similar to E39 objects but may or may not be compliant with that standard. They are similar in the sense that each object has a set of attributes and services that may be executed on the object. These objects are dissimilar because they do not have an ObjID or ObjType attribute (by default), and objects of the same class may have different attributes and services. Some objects are compliant with the E39 object services and will be noted.

A Service object is a support object for a Nameable object provided by a service on the Nameable object. These objects typically provide additional descriptive information or additional services that are optionally available for a particular Nameable. These objects may or may not have a name that identifies them. These objects are not available as child objects of the Nameable and do not have locators that uniquely identify them. These objects may be returned as a reference or as a value.

An Internal object is an object that is not visible in any way through the .NET interface. These objects are used in implementing the equipment server and are not relevant to clients.

Each object definition in the present invention describes the data (attributes and associated values) the object holds it holds, whether or not the data is read-only or read/write, the possible behaviors (state models) of the object, and the services (methods) users can access to control the behavior of the objects.

Figure 6:
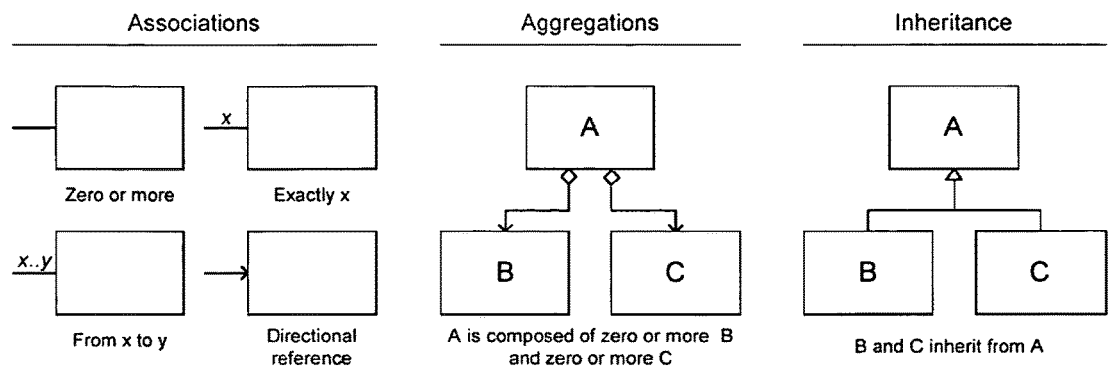
FIG. 6 illustrates the object model notation used in the UML diagrams in other figures that follow.

FIG. 6 illustrates the object model notation used in the UML diagrams in other figures that follow. All objects defined in the UML diagrams are Nameable Objects. Service Objects and Internal Objects do not appear in the diagrams. The relevant Service Objects are briefly described in the text for each figure. Object names in the UML drawings shown in normal text are concrete objects that may exist within the tool model. Object names in the UML drawings shown in italics are abstract objects and must be inherited by a concrete object.

The objects available fall into one of several groups. These groups are: The application root object, Interface objects, Management objects and The CEM framework objects. These groups and the objects in each of these groups are described in the following paragraphs.

Application Root Object. In a preferred embodiment, the equipment server of the present invention exposes a single application root object that allows access to all other objects in the server. The EibApplicationRoot object provides this single access point for all information. The application root object consists of the CEM model of the equipment, the interfaces that provide information to or from the equipment server, and several object managers, and definition objects. Definition objects are not shown as part of the object hierarchy because they are not Nameable objects and are accessed via services.

The application root object is added to the top of the CEM hierarchy to keep the Equipment model defined by CEM separated from the interfaces and management functions provided by the equipment server. For compliance with SEMI E39, the application root object provides the base E39 services for all objects within the system. It contains the logic to make all the Nameable objects within the system to appear as E39 objects. It does this by adding the concept of an ObjID and ObjType attributes to the Nameable objects that do not already have them. For full compliance with E39, there are some dependencies on the tool model. In a preferred embodiment E39 compliance is not required so the equipment server does not enforce the modeling rules.

The application root object provides a set of services for accessing definition objects. Definition objects are objects that define reusable definitions that may be used throughout the object model. All definition objects are service objects. The following definitions are supported in a preferred embodiment: Parameter Type definitions, Unit definitions and State Machine definitions.

The Parameter Type definitions define the data types used within the model. All attributes on Nameable objects within the system reference one of the parameter type definitions. A significant number of parameter type definitions are used plus any number of user defined parameter type definitions may be added. Parameter type definitions are capable of representing all simple data types defined in the present invention plus enumerations, arrays, and structures.

The Unit definitions define the units of measure used within the model. All attributes on Nameable objects may have a reference to one of the unit definitions to define the unit of measure for that attribute. Attributes without a link to a Unit object do not have a unit of measure.

The State Machine definitions define the state machines used within the model. All state machine attributes on Nameable objects within the system reference one of the state machine definitions. The state machine definition defines the legal states, the transitions between the states, and the events generated when transitions occur. Any state within a State Machine may be composed of sub-state machines.

Figure 7:
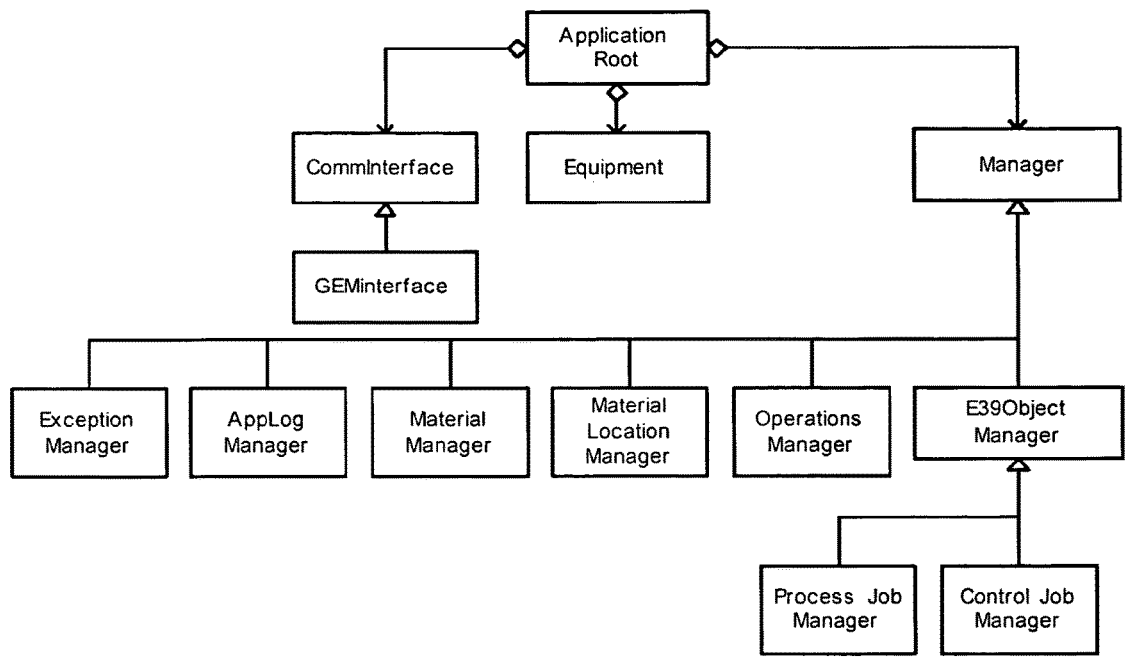
FIG. 7 illustrates details of the object model in an embodiment of the present invention.

FIG. 7 illustrates the application root object hierarchy. The EibApplicationRoot hierarchy for all internally defined CommInterface and EibModel Manager objects is shown. Many managers are individually configured and do not have to be included in an equipment model. All interfaces are individually configured and do not have to be included in an equipment model.

Interface Objects. The CommInterface is an abstract base for all interfaces to the equipment server of the present invention. An Interface to the server is a communication mechanism responsible for supplying data to or retrieving data from the CEM model. The only interface to CEM that does not have an object representing it is the native C#. In a preferred embodiment, the software that implements the present invention is written in C# and runs on a .NET framework.

The only internal CommInterface is a GEMInterface. Other custom interfaces may be added. The GEMInterface object represents a SECS/GEM Interface to the equipment server. The Interface may be either a to-tool Interface or a to-host Interface. The GEMInterface consists of several objects that provide information about the configuration of the interface and allow some aspects of the interface to be configured. More detail on the Host GEM interface and the Tool SECS/GEM interface are discussed below.

Manager Objects. The EibModelManager is an abstract base class for all managers in the system. A Manager is an object responsible for managing a collection of similar objects. The manager typically provides methods for obtaining the collection objects it manages as well as methods for performing actions on the collection of objects. Several EibModelManager objects are defined. Other custom manager objects may be added.

Figure 8:
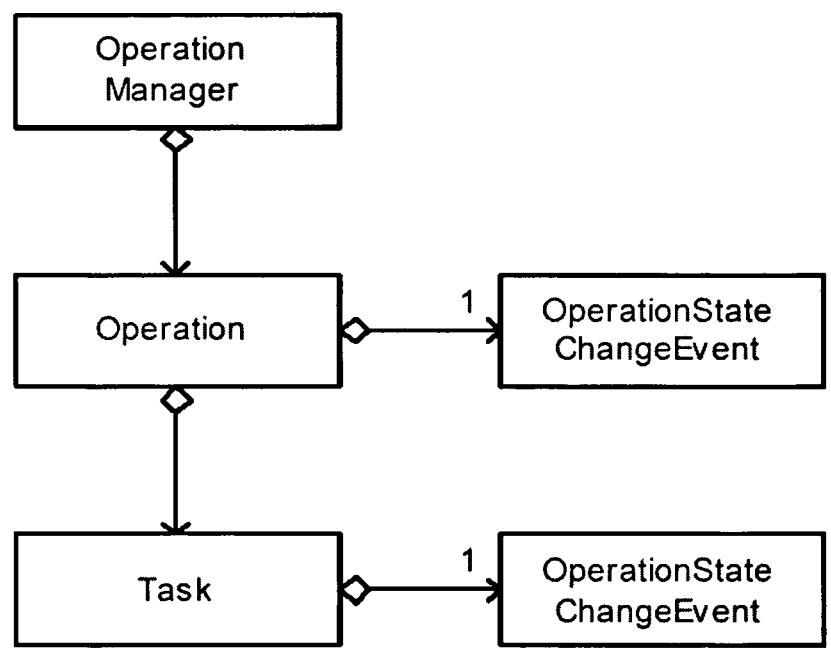
FIG. 8 illustrates details of the object model in an embodiment of the present invention.

The OperationManager is responsible for managing Operation and Task objects. The OperationManager has the ability to create control jobs and process jobs based on an XML description of a job. An Operation provides a control definition for a job to run on the equipment. A Task defines the process and process steps required to perform a process on some material. Both the Operation and the Task objects have an OperationStateChangeEvent for notifying clients when the state of the job changes. FIG. 8 illustrates the Operation Manager object hierarchy.

Figure 9A:
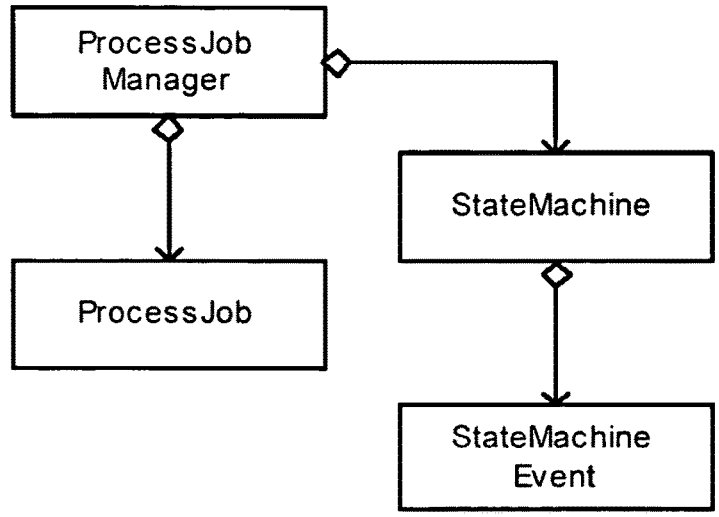
FIGS. 9A-9B illustrate details of the object model in an embodiment of the present invention.

The ProcessJobManager is responsible for managing E40 Process Job objects. It provides methods for accessing ProcessJob objects. The ProcessJob object represents an E40 process job defined on the tool. The manager does not provide any E40 Process Job Services. It only exposes the E40 Process Job objects as they exist on a 300 mm tool. FIG. 9A illustrates the ProcessJobManager object hierarchy.

Figure 9B:
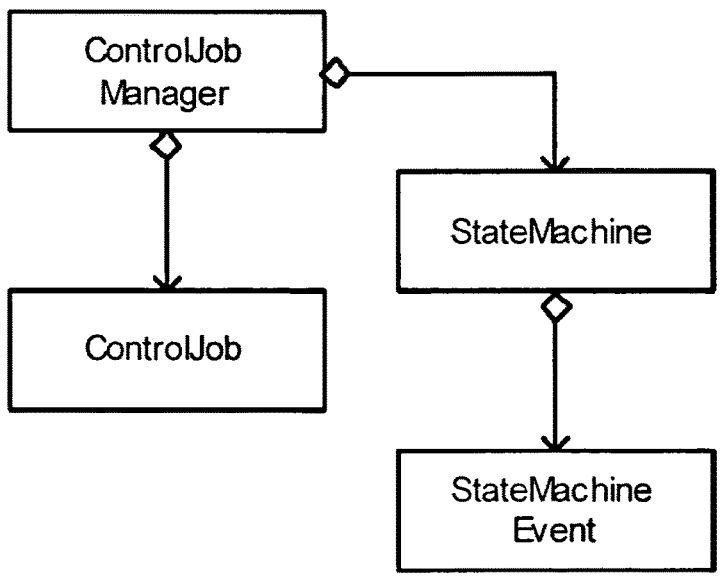

The ControlJobManager is responsible for managing E94 Control Job objects. It provides methods for accessing ControlJob objects. The ControlJob object represents an E94 control job defined on the tool. The manager does not provide any E94 Control Job Services. It only exposes the E94 Control Job objects as they exist on a 300 mm tool. FIG. 9B illustrates the ControlJobManager object hierarchy.

Figure 10A:
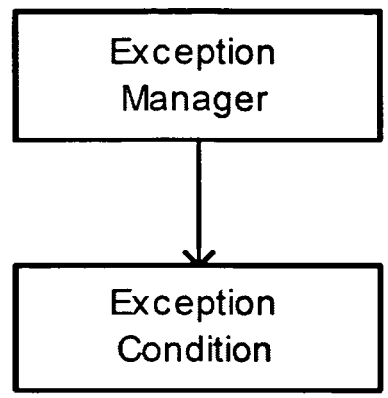
FIGS. 10A-10B illustrate details of the object model in an embodiment of the present invention.

The ExceptionManager is responsible for managing the ExceptionCondition objects. It provides a method of accessing ExceptionCondition objects defined within the CEM model from a single location. ExceptionCondition objects are not children of the ExceptionManager. The ExceptionCondition is owned by the CEM object the ExceptionCondition is reported by. The names of the ExceptionCondition objects are not necessarily unique within the ExceptionManager. The ExceptionManager manages ExceptionCondition objects by the Locator (which is unique) rather than the name. FIG. 10A illustrates the ExceptionManagerlCondition object hierarchy.

Figure 10B:
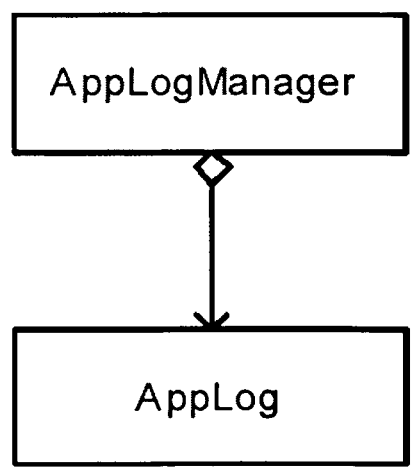

The AppLogManager is responsible for managing the AppLog objects. An AppLog object is responsible for logging information about a specific component of the equipment server. FIG. 10B illustrates the AppLogManager object hierarchy.

Figure 11:
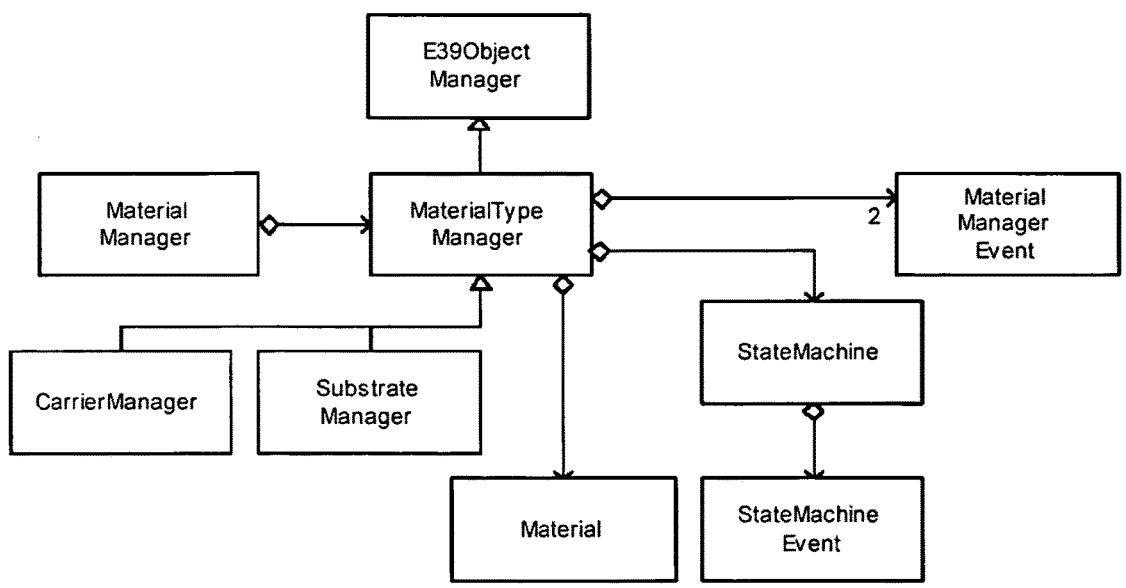
FIG. 11 illustrates details of the object model in an embodiment of the present invention.

The MaterialManager is responsible for managing the Material objects. The MaterialManager has a MaterialTypeManager for each material subtype defined in the CEM model for the equipment. The MaterialTypeManager provides a method of creating, accessing, and releasing Material objects that reside in MaterialLocation objects within the CEM model from a single location. Each MaterialTypeManager has two MaterialManagerEvent objects, one for creating material and one for releasing material. FIG. 11 illustrates the Material Manager object hierarchy.

Figure 12:
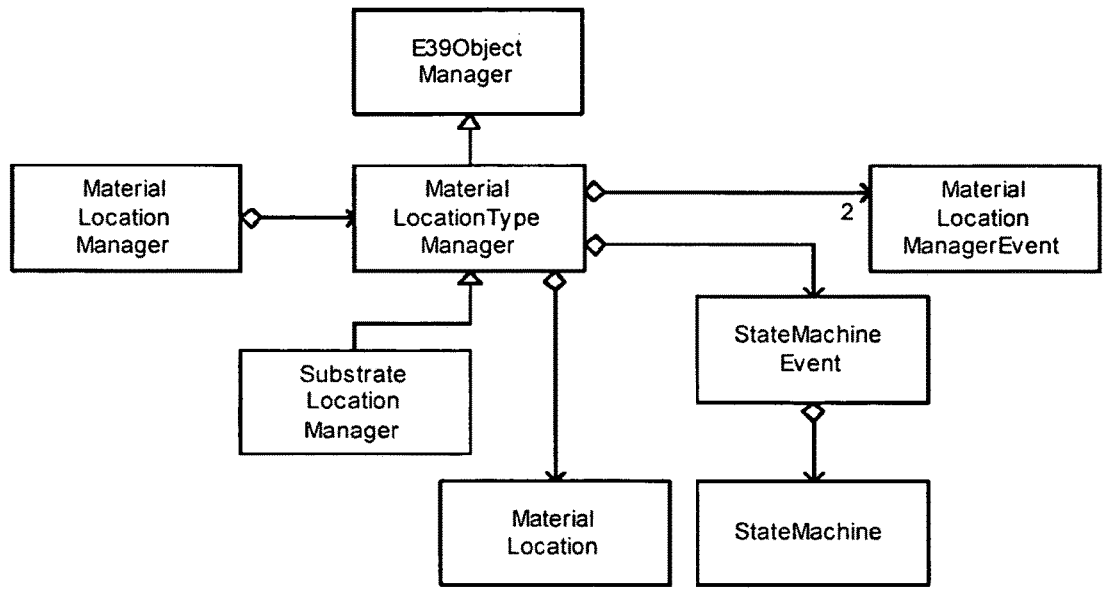
FIG. 12 illustrates details of the object model in an embodiment of the present invention.

The MaterialLocationManager is responsible for managing the MaterialLocation objects. The MaterialLocationManager provides several methods for moving material from one location to another in the model. The MaterialLocationManager has a MaterialLocationTypeManager for each material subtype defined in the CEM model for the equipment. The MaterialLocationTypeManager provides a method of creating, accessing, and releasing MaterialLocation objects defined within the CEM model from a single location. FIG. 12 illustrates the Material Location Manager object hierarchy.

Figure 13:
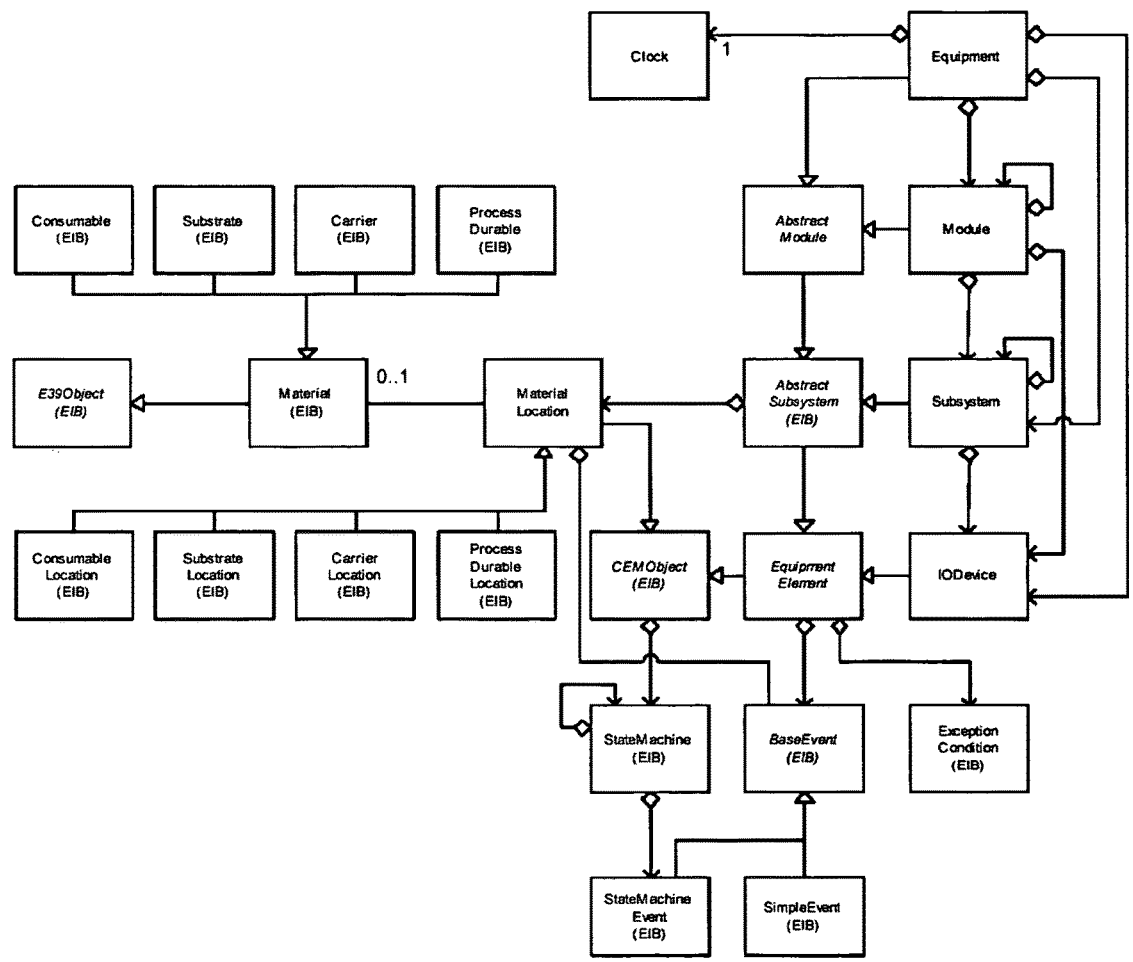
FIG. 13 illustrates details of the object model in an embodiment of the present invention.

CEM Framework Objects. The CEM standard and its implementation by the present invention define a hierarchy of generic object classes that are used as building blocks to represent the physical and/or logical view of a semiconductor tool as seen by the MES through a communications interface. FIG. 13 illustrates both the interface inheritance hierarchy for the abstract objects and the concrete subtypes as depicted in the CEM standard, and the additional objects provided by the implementation of the present invention.

The abstract objects define the attributes, state models, and services (methods or behaviors) of the concrete subtype objects described above. The abstract objects are not implemented directly. The CEM standard and its implementation by the present invention define a hierarchy of generic object classes that are used as building blocks to represent the physical and/or logical view of a semiconductor tool as seen by the MES through a communications interface. These object classes include the following: Equipment, Module, Subsystem and IODevice.

One of the primary purposes of CEM objects is to allow data and available commands to be associated with the hardware component they truly belong with on the tool. The present invention provides a standard set of pre-defined commands and attributes for each of these objects. In addition to these, additional custom commands and attributes may be added as needed via the tool model to represent the specific capabilities of the tool. The CEM Standard and its implementation by the present invention define specific objects that embellish the generic building blocks defined above. Some of these objects are formally defined by CEM, others are specific to the present invention. These objects include: Clock, MaterialLocation (ConsumableLocation, SubstrateLocation, CarrierLocation, and ProcessDurableLocation), ExceptionCondition, BaseEvent (SimpleEvent, StateMachineEvent), State Machine.

The CemObject is an abstract base class that defines an object defined in CEM. All CEM objects have a uid attribute that defines universally unique identifier for the CEM based object. The CemObject may have zero or more Simple Events or zero or more StateMachine objects.

The E39Object is an abstract base class that defines the additional attributes required for an E39 Object Services Object. All E39Objects have a Name and an ObjType that defines the E39 Object type.

The EquipmentElement is an abstract base class that provides the base functionality for each hardware component that is modeled in the tool. The EquipmentElement provides a service state for the component and a set of attributes that describe the component. The EquipmentElement may have zero or more SimpleEvent, and ExceptionCondition objects. The EquipmentElement may have zero or more Exception Condition objects.

The SoftwareModule object is a service object that represents software or firmware for the component.

The Abstractsubsystem is an abstract class that represents the base functionality required by all components that may handle material. The Abstractsubsystem may have zero or more MaterialLocation objects in addition to all the functionality provided by the EquipmentElement.

The AbstractModule is an abstract class that represents the base functionality required by all components that perform processing or execute recipes. The AbstractModule provides a behavior state for the component and a set of commands and attributes related to processing material in addition to all the functionality provided by the AbstractSubsystem.

The Equipment object is at the application root of the hierarchy and is based on the AbstractModule. It is composed of other objects below it, that is, it is an aggregate of the Module, Subsystem, and IODevice objects. The Equipment object has a Clock object that always exist on it. The Module object represents major subsystems that handle processes.

The Module is based on the AbstractModule and may be an aggregate of other Module, Subsystem, and IODevice objects.

The Subsystem object represents subsystem and subassembly components of the equipment. The Subsystem object is based on the Abstractsubsystem and may be an aggregate of other Subsystem and IODevice objects.

The IODevice object represents the lowest level of complexity and includes, for example, I/O devices such as sensors, actuators, and intelligent sensor/actuator devices that provide process data to the MES. The IODevice is based on the EquipmentElement.

The Clock object provides the time-keeping mechanism. The clock provides the ability to request and set the current time and date using multiple formats. A CEM model has a single clock object on the Equipment object.

The ExceptionCondition object represents an abnormal condition or state that may occur on the tool. An exception condition may be an alarm or an error. Alarms are abnormal situations that may endanger people, equipment, or material being processed. Errors are conditions that do not endanger people, equipment, or material and may be recoverable.

The MaterialLocation object represents a location in the tool capable of holding material. A preferred embodiment of the present invention adds MaterialLocation object subtypes that identify places capable of holding material for certain types of materials including consumables, substrates, carriers, and process durables. All MaterialLocation objects are E39 objects in addition to being a CemObject. This is not shown in the diagram due to the fact that the preferred embodiment of the present invention does not support multiple inheritance (one object cannot be derived from more than one object). Instead, the MaterialLocation object directly implements all the features of an E39Object.

The ConsumableLocation object represents a location in the tool capable of holding a consumable. A consumable is some material consumed by the tool during the process of creating a product. The Consumable object represents the consumable. The Consumable object is an E39 compliant object.

The SubstrateLocation object represents a location in the tool capable of a substrate. A substrate is one unit of the material that the tool is processing. The substrate becomes one or more products once all processes on the substrate are complete. The Substrate object represents the substrate. The Substrate object is an E39 compliant object.

The CarrierLocation object represents a location in the tool that a carrier may be placed on the tool or exists internally inside the tool for holding material. A carrier is capable of holding one or more units of a specific material type (consumable, substrate, or process durable).

The Carrier object represents the carrier. The Carrier object is an E39 compliant object.

The ProcessDurableLocation object represents a location in the tool where a process durable exists. A process durable is an exchangeable or replaceable item that the tool uses in the process of creating a product. The process durable used often depends on the product that the tool is creating.

The ProcessDurable object represents the process durable. The ProcessDurable object is an E39 compliant object.

The StateMachine object represents an instance of a state machine implemented by an attribute on a Nameable object. It contains a reference to the state machine definition for this state machine. In the case of a complex state machine, the StateMachine object will contain child StateMachine objects, one for each sub-state machine in the state machine definition. The StateMachine object also contains a set of child StateMachineEvent objects, one for each event the state machine can generate.

The EibModelEvent object is an abstract object that represents an occurrence on the tool that cannot logically or easily be modeled as a change in a value in the model. All tools have software that controls the actions on the tool. The CEM model does not have complete visibility into this software. Having complete visibility into the software would make the CEM model more complex than necessary and more difficult to understand. An event in CEM is used to model an action or a state change in this software.

The SimpleEvent object represents an event or action taken by the internal tool software. It represents this event in the tool model and provides the means for external systems to be notified when the event occurs on the tool.

The StateMachineEvent object represents an event that can be generated by a state machine. It provides the means for external systems to be notified when the state machine transitions. Events in state machines fall into one of the following general categories:

1. A state change occurred: State machine generates a single event for all possible transitions within the state machine.
2. The State Machine transitioned to a state: State machine generates one event for each state the state machine may enter.
3. A State machine transition: State machine generates one event for each possible transition from a source state to the new state.

Figure 14:
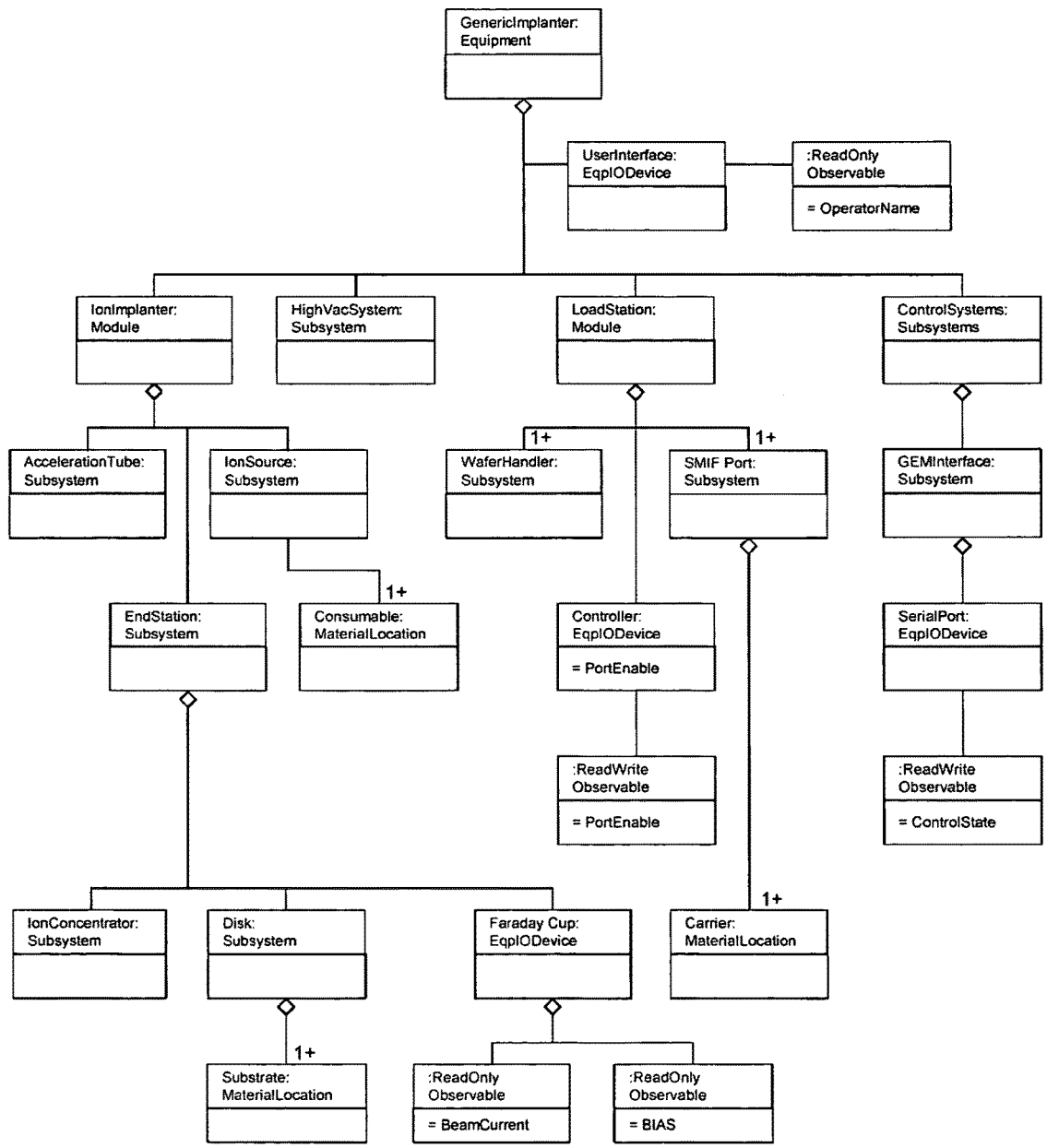
FIG. 14 illustrates details of the object model in an embodiment of the present invention.

FIG. 14 illustrates a sample object model of an Ion Implanter.

Interface Overview

The present invention allows programmers to develop interfaces that can adapt to any automation solution using multiple commercial communication protocols. For host applications, a Client/Server run-time architecture is provided that enables client applications, both internal and external to the factory, to communicate with the model via support of distributed object-based communications technologies such as DCOM, .NET, HTTP/SOAP, GEM and Custom interfaces.

For tool applications, the present application can externally access equipment or component data using a SECS or Custom connection. In tool solutions are accomplished with a direct connection to the equipment Server.

In order to utilize the SECS/GEM legacy interfaces described above, the object model must be able to handle the SECS messages exchanged between the host and the tool. To accomplish this, certain configuration parameters need to be defined, and SECS/GEM variables need to be mapped to objects in the object model and to particular attributes within the objects.

The Legacy Mode facilitates installing the present invention into a legacy factory infrastructure with virtually no changes to the legacy systems. The only change required to the existing systems is reconfiguration of the factory cell controller application to communicate with the equipment server in Legacy Mode rather than directly to the host. The Legacy Mode is then configured to communicate with the tool.

As described above in conjunction with FIG. 3, 4 and 5, the Legacy Mode connection allows the equipment server and the host to essentially share a single SECS connection to a tool. To the equipment server, the Legacy Mode acts as a SECS/GEM legacy interface.

In a preferred embodiment of the present invention, distributed object communications technologies are used, such as DCOM and .NET, to enable multiple client programs to simultaneously access the CEM object model. Point-to-point SECS/GEM interfaces are not capable of providing this functionality. By allowing multiple client programs both internal and external to the factory access to the CEM object model, more than one user at a time can have operational data about a tool's performance, facilitating better tool management decisions.

Distributed object communications technologies such as DCOM and .NET are implemented as object-oriented remote procedure call (RPC) style communications. In typical RPC communications, a client application invokes a remote function by making a call to a client stub. The stub marshals the data (packs the call parameters into a request message) and invokes a wire protocol to send the message to the server. The server stub unpacks the message and calls the requested function on the object. The data resulting from the function is sent back via the same process, but in reverse.

Model Builder

A preferred embodiment of the present invention incorporates a tool known as Model Builder. Model Builder is a .NET based GUI tool used to create and edit equipment tool models for use by the equipment server. These equipment models can be saved to an XML formatted file which is then validated against XSD schema files. Upon startup, the equipment server can read newly created equipment model XML files.

Features of Model Builder

Simplifies the task of building and maintaining SEMI CEM compliant equipment models for use by the equipment server.

Reduces the time to build complex equipment models.

Interactive GUI allows you to define a view of the equipment in a hierarchical relationship.

Standard Windows look-and-feel conventions and behaviors for user interfaces.

Supports the configuration of user defined custom interfaces as defined by user supplied XSD schema files.

Easily links elements in interfaces to objects in the model.

Imports GWGEM GCD files, using all data related equipment model data to build the basic model structure.

A preferred embodiment of the present invention is configured via an XML configuration file which specifies managers and services, the tool model and the interfaces. The syntax of the XML file is governed by a set of XML schema definition language (XSD) schemas. A schema describes the structure that the XML document instance needs to adhere to, providing not only the syntax but also defining the way in which elements and attributes can be represented in the XML document. A schema can also import or reference other schemas.

The present invention uses a "top level" schema, "EIB.xsd", which defines the basic framework for configuration. This framework includes the definition for managers and services, and the elements that will import the tool model schema and the interface schemas. Model Builder utilizes the XML schemas for the discovery of the configuration items and their structure. Model Builder can also be made aware of user defined XSD schemas for configuring custom interfaces added to the equipment server. The schemas that are part of the product as well as the custom interface schemas are read in during startup of Model Builder.

The Model Builder application creates an XML configuration file based on the tool model configured with the Model Builder GUI. A model can be created from inception, or by opening an existing model file. The New option on the GUI menu will generate a default model for those required elements within the "top level" schema. The Open option on the GUI menu allows the user to select an existing XML configuration file that will be utilized to create the model. This file will be read in and validated against the schemas. If successful, the tool model is created.

Figure 15:
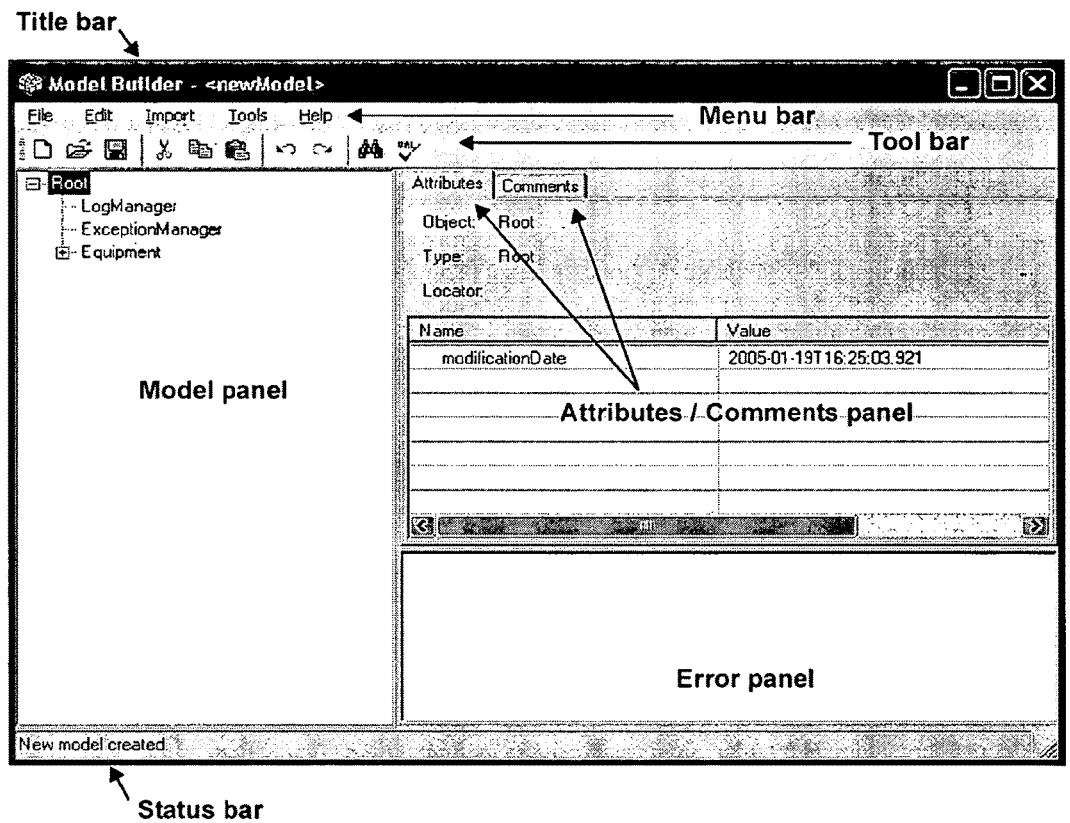
FIG. 15 illustrates details of the object model in an embodiment of the present invention.

FIG. 15 illustrates the Model Builder GUI and its basic components, which are described in more detail below.

Title Bar: Displays the model file name being edited. <newModel> indicates a newly created model which has not yet been saved. * after the filename indicates edited/unsaved changes.

Menu Bar: Contains the menu options to create and manipulate the model.

Tool Bar: Contains icon buttons with shortcuts to particular menu items. Buttons include: New Model, Open Model, Save Model, Cut, Copy, Paste, Undo, Redo, Find Object and Validate Model.

Model Panel: Displays the model in tree form. Nodes with children can be expanded or collapsed by clicking on the + or − to the left of the text. Clicking on a node populates the Attributes Pane and Comments Pane with information for that model node. Hot tips display node type. Right clicking displays a context menu with possible actions for that specific node, including possible node types that can be added as children.

Attributes Panel: Displays general information about the node such as object's name, type, locator and an edit panel with each attribute's name and value. Editable attributes are identified with a pencil icon. Attributes are sequenced as follows: Object identifying attributes (displayed in bold text), Required attributes (displayed in normal text), and Optional attributes (displayed in italicized text).

Comments Panel: Allows the user to enter, view and edit user defined comments in Model Builder. The comments will appear verbatim within XML nomenclature in the tool model. Comments are attached to the selected object node.

Error Panel: Displays errors encountered while performing model load, validate and save operations. Clicking on an error selects and displays the object in the Model Panel with its attributes in the Attribute Panel. If the error is also associated with a specific attribute, then that attribute will also be selected in the Attributes Panel. Double clicking on a row displays a pop-up with the error text.

Status Bar: Displays status information as actions are performed.

The menu commands that are available in a preferred embodiment of Model Builder are illustrated in the table below.

| Menu | Options | Description and Shortcut |
| --- | --- | --- |
| File | New | Creates new model. Ctrl + N. |
|  | Open | Opens an existing model. Ctrl + O. |
|  | Save | Saves the current model to its associated file. Ctrl + S. |
|  | Save As | Saves the current model to a new file name. |
|  | Validate | Validates the model. |
|  | Recent Files | Displays a sub-menu with the four most recent model file names viewed. Selecting an entry will open that model. |
|  | Exit | Exits the application. |
| Edit | Undo | Undo last node cut/paste/move action. Enabled if cut/paste/move action done since model opened or created. Ctrl + Z. |
| | Redo | Redo last "undo" action. Enabled if "undo" action performed. Ctrl + Y. |
| | Cut | Cut selected tree node. Enabled if node can be cut. Ctrl + X. |
| | Copy | Copy selected tree node. Enabled if node can be copied. Ctrl + C. |
| | Paste | Paste node in tree. Enabled if node previously cut or copied can be pasted as child of selected node. Ctrl + V. |
| | Find | Displays Find dialog's Find Object and GoTo Reference tabs enabling the user to find node(s) in the current model matching specified text and allowing the user to view references to the found node(s). Ctrl + F. |
| | Replace | Displays Find dialog's Replace tab, enabling the user to replace a substring in node (object) names with another substring for current model displayed in Model Panel. Ctrl + H. |
| | Expand Subtree | Expands all nodes in the subtree headed by the selected node. |
| | Collapse Subtree | Collapse Subtree Collapses all nodes in the subtree headed by the selected node. |
| | Add | Adds an object of the selected type specified in its submenu as a child of the selected node The sub-menu is dynamically reconfigured each time a node is selected, since only the object types that can be children of that node can appear. Enabled if the selected node can have child nodes added. |
| Import | GW Config (gcd) | Imports a GCD file, selectable via a file dialog window, and merges it into a newly created model. Enabled if new model displayed in Model Panel. |
| | Tool Model (xml) | Imports a tool model file, selectable via a file dialog window, and merges it into the existing model. Enabled if model displayed in Model Panel. |
| Tools | UIDs | Displays submenu which allows the regeneration of values for attributes of Universal Identifier (UID) type for either the selected node ("Regenerate Node UIDs") or for the sub-tree headed by the selected node ("Regenerate Subtree UIDs"). Enabled if model displayed in Model Panel. |
| | Options | Displays options dialog box, allowing the user to specify the folder defaults for tool models and custom interface schemas. Options are saved under the user registry. |
| Help | About | Displays the "About" dialog box. |

Figure 16:
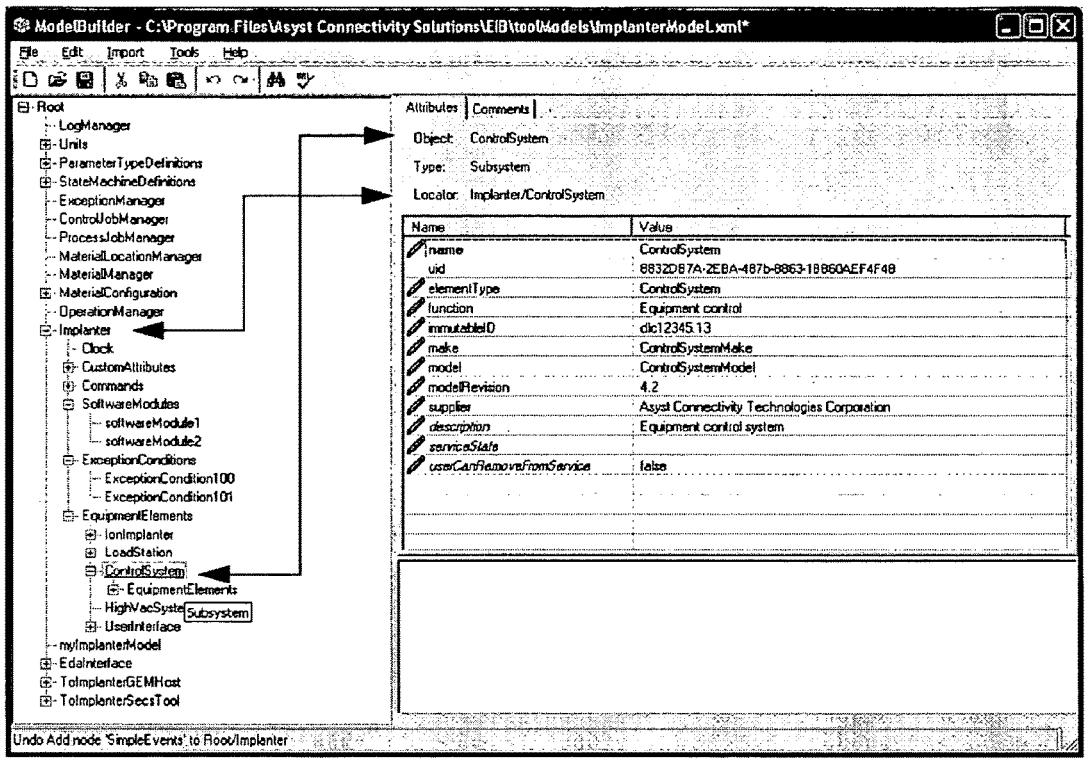
FIG. 16 illustrates details of the graphical user interface of the model builder of the present invention.

FIG. 16 illustrates an overview of the attribute window that is utilized in editing object attributes. When editing object attributes, it is important to be cognizant of the location within the tool model. Note the relationship between the Model pane on the left with the Attributes tab pane on the right in FIG. 16. The Attributes tab pane indicates the following three parameters: Object (long arrow): the attributes that can be edited belong to the Object stated here, Type: the Type indicates the type of object, and Locator (short arrow): the Locator indicates the object's location within the tool model. The Locator text can be copied for later use when editing other object's attributes (i.e., pasting into text box or single-selection list box). The Locator indicates the interface name for objects within an interface. The Locator tag is also renamed to Interface.

Object attributes shown with a yellow or blue pencil icon in the attributes panel can be altered. The blue pencil icon denotes that the attribute has a hot tip providing additional editing information. These attributes can be edited in one of three ways: Text box—Allows a user defined text entry, Multi-selection list box—Multiple pre-defined values can be selected, and Single-selection list box—Only one pre-defined value can be selected.

Validation of the tool model confirms the integrity of the tool model. If there are no errors in the model, a Validation successful message will appear in the Model Builder status bar. If your tool model contains errors, validating will expose them. The types of errors are displayed in the Error panel of the ModelBuilder GUI.

Host/Client to Server Communication

Figure 17:
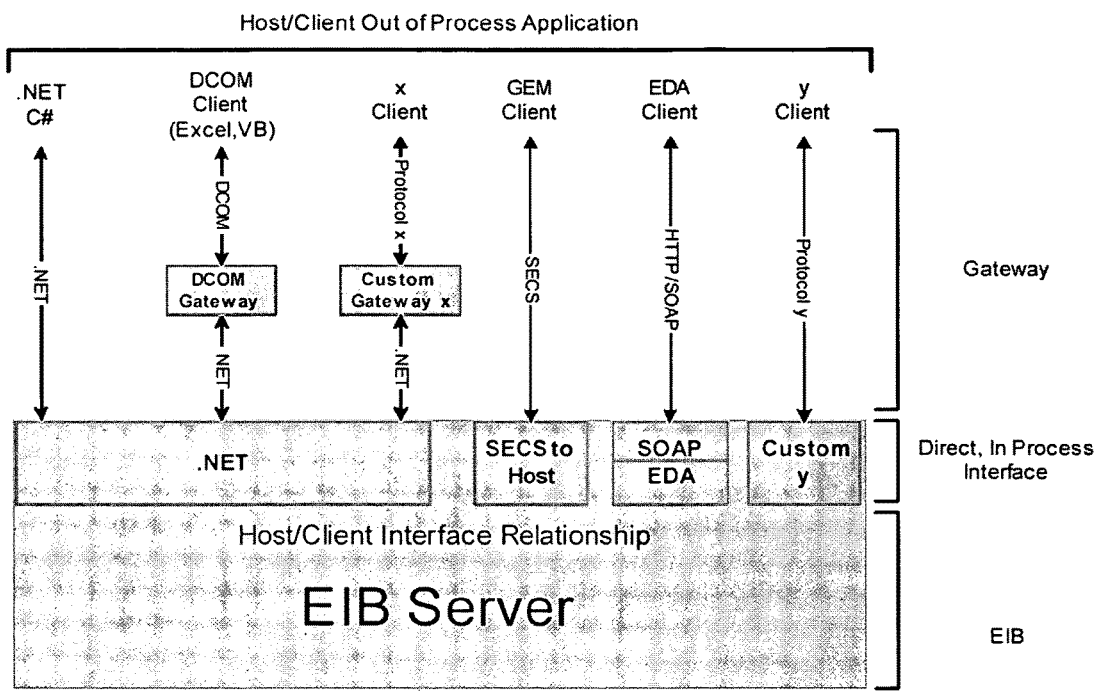
FIG. 17 illustrates the host/client interface relationship of an embodiment of the present invention.

FIG. 17 illustrates possible Host/Client connections to the equipment server of the present invention. The following types of interfaces are supported in a preferred embodiment, .NET, DCOM, GEM, EDA and Custom interfaces.

.NET Interface. The .NET client interface enables a .NET implemented program running on one computer to access the objects and methods of another program running on a different computer using object serialization. Object serialization allows the passage of complex data structures over a network without writing any code to reconstruct them. This makes the equipment server available to .NET clients written in any .NET application.

The .NET Remoting Interface is the most fundamental gateway used to connect to the equipment server of the present invention. This framework allows objects to interact with one another between remote client and server applications. This external interface connects to the equipment server using a .NET connection from a Host or Client. When starting an external interface, the interface application will need to verify that the equipment server is running by opening a connection to the equipment server.

Basic information on .NET Remoting can be found in the Microsoft Software Developers Network (MSDN) in articles such as "Microsoft .NET Remoting: A Technical Overview." The discussion that follows presents a brief presentation of this mechanism and its relationship with the present invention.

.NET Remoting can occur across HTTP or TCP channels. .NET Remoting messages may be encoded in either binary (via binary formatter) if performance is a primary concern or XML (via SOAP formatter) if inter-operability is a primary concern. TCP channels use binary formatting to serialize the message by default. This is the mechanism used in a preferred embodiment of the present invention, as shown in the examples discussed below.

The primary value of a remoting framework is to provide a simple mechanism to access methods on remote objects and get results returned. The .NET interface is one of several available in a preferred embodiment of the present invention. This interface must be defined in the tool model just as any other interface. If it is not defined in the tool model, a .NET remoting interface will not be available.

In a preferred embodiment of the present invention, the Model Builder tool described above may be used to verify or add a .NET Remoting interface to a model using the following steps:

1. Open the tool model in Model Builder.
2. Look at the objects defined on Root. If a .NET remote interface exists, it will always be the first interface Oust after the Equipment node). If it exists, click on it to view the configuration.
3. To add a .NET remote interface, right click on Root and select Add>RemoteInterface. Set the name, protocol, and port number to perform remoting on. Additionally, if multiple network cards exist in the computer, the bindTo attribute can be set to bind the server to a specific network interface. The following attributes with associated data types are part of the RemoteInterface object:

name (string): Name of the remote interface. This is the name remote clients will use when connecting with this server.

protocol (enumeration): The protocol to use when connecting the server (tcp or http)

port (nteger): TCP/IP port number for the server to bind to bindTo (string): For systems with multiple network cards, set this to the IP address of the network card to bind to. This may be left blank for all other systems.

The Tool model of the present invention has an additional configuration option that indicates if the EibServer object should be remoted. This configuration option is remoteEibServer on the NetRemotingInterface element. This option defaults to true indicating that the EibServer object will be remoted. If this option is set to false all standard access to the equipment server is disabled.

A preferred embodiment of the present invention supports systems installed with multiple network interface cards (NIC). To enable this multiple network feature, the bindTo attribute in the RemoteInterface definition must be set to the address to bind with. Once this is done, clients must take care to connect with the correct IP address. Note that this example only applies when running a local instance of EibExplorer.

Three basic steps must occur for connecting to the equipment server from a C# .Net client:

Step 1. Opening the channel. At least one channel must be registered with the remoting framework before an object can be accessed.

Step 2: Create the proxy object.

Step 3: Access the eqiument server application root. Once the connection is established to the equipment server, a reference to the application root can be obtained through the GetApplicatonRoot( ) method. This application root object will provide access to all equipment server objects and methods. The url used for the connection must exactly match up with that in the tool model for .NET Remoting. In particular, the url is of the form: tcp://machineName:port/.netName. For example, if a tool model includes the following .NET Remoting definition:

<Eib:RemoteInterface protocol="tcp" port="8201" name="myImplanterModel"/> and it is on IP 192.168.1.101, then the client should access that equipment Server with a URL of: tcp://192.168.1.101:8201/myImplanterModel. Clients should guarantee equipment server connection health. This can be done with a connection health model that heartbeats to the server and attempts reconnection if the heartbeat fails.

Basic Messages. Messages fall in two main categories: messages related to event reports and message relating to everything other than events. Non-event related messages include:

Getting/Setting Attribute Values (GetAttrNames( ), GetAttr( ), SetAttr( ) . . . )
Remote Commands (ObjectAction( ) . . . )
Process Programs (MakeRecipe( ) . . . )
WaferMap Event related messages include:
Attribute set events
Simple events
Custom events
Trace events Note that the event system used by the equipment server requires the client also be a server. The equipment server makes direct remote calls automatically to the client. To setup a listener on an attribute, AddAttributeSetListener is called on the object holding the attribute with the name of the attribute. To setup a listener on an event, IBaseEvent's AddEventListener( ) is called on the event object with an optional report. The client will notify the EventTriggered( ) method in the application when the event occurs. If a report was specified on the call to AddEventListener( ) the values of the attributes in the report will be provided with the notification.

Remote Object Lifetime Management in Net. Basic information on remote object lifetime management can be found in the MSDN article entitled: "Managing the Lifetime of Remote .NET Objects with Leasing and Sponsorship."

Creation of .NET clients for any application requires an appreciation of the .NET approach to Object Lifetime Management. When the object is created, a "lease" is created for the object. The time-to-live for the object is set to the initial lease time for the object, typically around 5 minutes. Each time a remote reference is made to an object, the time-to-live for the object is reset to the renewal lease time. As long as references continue to be made to the object, the object remains alive.

If the time-to-live becomes 0, the remoting layer releases the object. If local references still exist to the object, it remains alive locally only. If no local references exist, the object is garbage collected. To prevent an otherwise expired object from being released when time-to-live becomes zero, an object may have sponsors. When the lease expires on the object, the system will query each sponsor. The time-to-live will then be reset based on the sponsor. The advantage of this mechanism is that a client cannot cause a server to "leak" memory by not releasing its references to an object except by repeatedly polling the object. The downside of this mechanism is that the client and the server must be more proactive to keep the objects alive.

In a preferred embodiment of the present invention, all static objects have infinite lifetimes. For dynamic objects, we must define leases and sponsors. If a dynamic object is available in remoting, it is either described here or has been given an infinite lifetime. Dynamic Objects fall into one of two lifetime determining categories: Server Activated object or Host Client/Source Activated object.

Server Activated Dynamic Objects. The server creates and maintains server activated objects for all clients. Consequently, the present invention will create a sponsor that will keep the object alive as long as the object exists. When the object is released, the sponsor will be removed, allowing the object to be garbage collected when the time-to-live expires. Server Activated Dynamic objects are:

Operation: lifetime management configurations are setup by the OperationManager. The OperationManager will manage the lifetime.

Task: lifetime management configurations are setup by the OperationManager. The Operation will manage the lifetime.

OperationStateChangeEvent: lifetime management configurations are setup by the OperationManager. The Control Job/Process Job will manage the lifetime.

MaterialLocation: static locations in the model will have an infinite lifetime. Dynamic locations will be managed and configured by the MaterialLocationTypeManager.

Materal: lifetime management configurations are setup and managed by the MaterialTypeManager.

Host Client or Source Activated Objects. Client or Source activated objects are:

Report

TraceReport

Recipe

Notification (e.g. IEventListener)

CustomEvent

ISynchronousSource

Client (or Source) Activated Objects are handled differently. A preferred embodiment of the present invention does not allow a client to directly create any objects, but rather provides methods to create objects for them. In this case, the object is for a specific client.

For clients, sponsors for objects are created when possible and the objects are managed as well as possible as opposed to forcing the client to sponsor all objects.

IApplicationRoot. Note that there are a number of methods on IApplicationRoot that have parameters added to define initial and renewal lease times. These methods are:

MakeReport

MakeTraceReport

MakeEvent

MakeReportUid

MakeTraceReportUid

The two additional parameters to facilitate client's use of reports and events are: initialLeaseTime, the initial lease time in milliseconds for remoting (0 for .NET default initial lease time), and renewLeaseTime, the renewal lease time in milliseconds for remoting (0 for .NET default initial lease time). Note neither of these parameters may be negative. Negative values will cause an exception.

Notifications. In these cases the client is now the "server" and the equipment server is holding a reference to client objects. The client will have the ability to tell the equipment server if it should add a sponsor. The sponsor will be added when the listener is added and remove it when the listener is removed (or completes in the case of trace)

IReport. If the equipment server is instructed to add a sponsor to an IEventListener or other Notifier, it will also add a sponsor to the report. This sponsor will be added and removed at the same time as the sponsor is added to the IEventListener. There is one potential problem in which the equipment server cannot protect the client. If a Client creates a report and then waits past the default object lifetime before it registers for an event, it would be possible for the lease to expire on the report before the sponsor was added. There would be nothing that the server could do. In this case, the client would have to sponsor the report.

CustomEvent. The Client creating the event has the ability to set the lifetime configuration and is responsible for managing these objects.

Recipe. There is no functionality provided for recipes. They have default lifetimes and the Client will be responsible for managing them.

Source Activated Objects. For sources, sponsors for objects are created when possible and the objects are managed as well as possible as opposed to forcing the source to sponsor all objects. In all instances, the source will have the ability to tell the equipment server if it should add a sponsor. The sponsor will be added when the source is set, then remove the sponsor when the source is removed.

Host GEM Interface. In a preferred embodiment, the present invention includes a GEM compliant Host interface for accessing information in the tool model and issuing commands to the equipment server. The GEM connection supports a serial connection per the SEMI E4 SECS-I standard. It also supports High Speed SECS Messages Services Single Session Mode (HSMS-SS) per the SEMI E37 standard which uses an Ethernet connection for communications with the tool instead of the tool's serial communications port.

The Host GEM Interface is one of several available in a preferred embodiment of the present invention. This interface will only exist if it is configured in the tool model. A Host GEM Interface can be added to a model by opening the model in ModelBuilder and adding a SecsToHostInterface to the Root element. The process of developing both Host and Tool Secs/GEM Interfaces is described below.

Custom Interface. If a client requires a connection using a protocol that is not supported as part of the standard client interface set, there are two custom approaches that can be taken to build a communication gateway. First, the gateway can use and interface to the equipment server as its "tool side" connection to connect Client x as required by Protocol x, as shown in FIG. 17. The advantage of this method is that the implementer can stay fairly removed from the equipment server. Alternatively, a custom interface to a new protocol can be written to communicate to Client y as required by Protocol y, as shown in FIG. 17. This approach requires closer integration with the equipment server, which may be justifiable if the interface is to be productized.

The present invention allows any number of custom interfaces to be added in one of two ways: directly into the server, or as a client over .NET. Generally, custom interfaces are rarely created for host applications. The established Host interfaces manage most, if not all of these demands.

EDA Interface. A standalone SECS/GEM interface cannot meet the future needs of the semiconductor factory because:
  SECS does not reveal the structure of equipment making it impossible to determine the physical makeup of equipment.
  SECS is not a discoverable interface; applications can not query the equipment to determine its capabilities.
  SECS supports only a single client; there is no support for simultaneous multiclient access to equipment information.
  SECS has no security mechanism; there is no concept of client authorization and access permissions in SECS.

Figure 18:
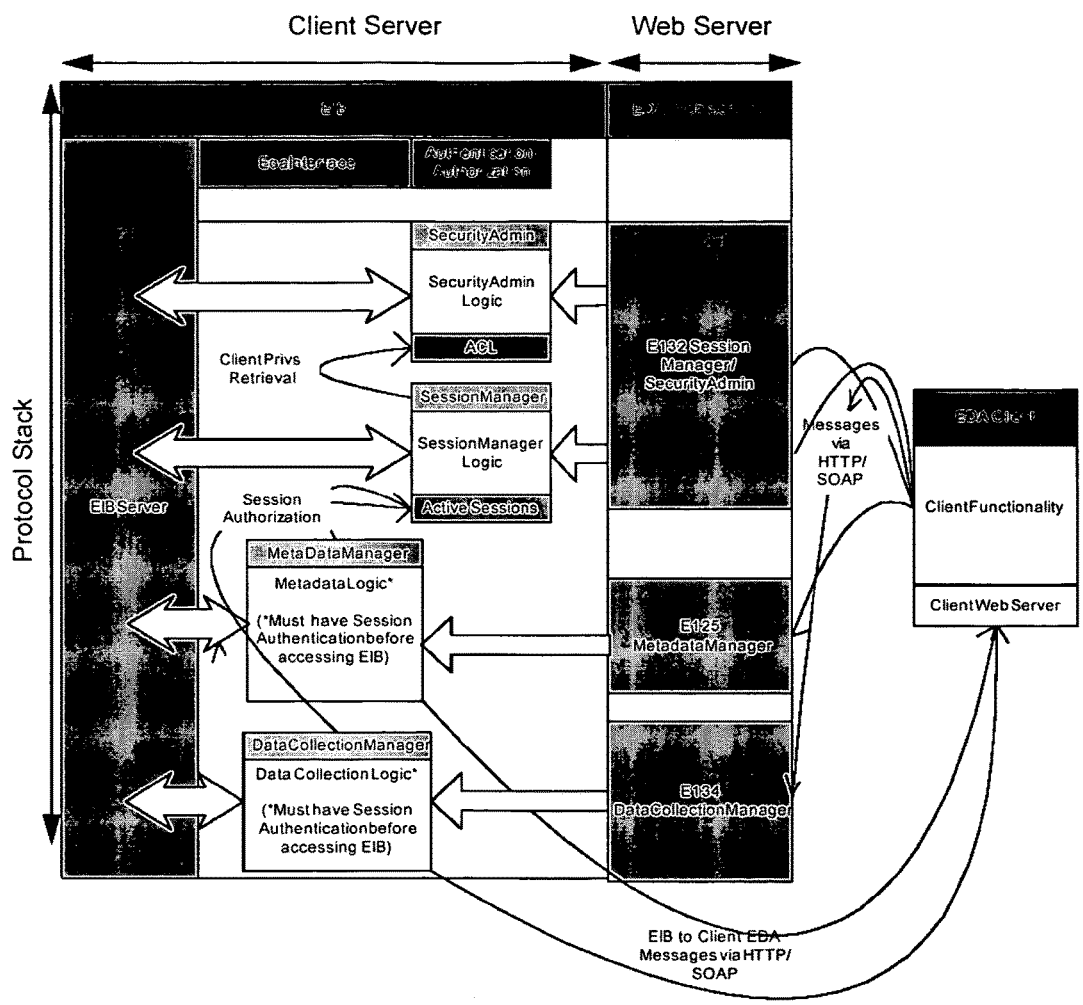
FIG. 18 illustrates communication between a client and the equipment server in an embodiment of the present invention.

As dictated by Equipment Data Acquisition (EDA) related SEMI standards, a preferred embodiment of the present invention implements an HTTP/SOAP/XML interface. The advantages of this interface structure are:
  Cross-platform, cross language RPC mechanism
  Industry standard technology
  Provides multiple connections (one to many)
  Wide industry support ensures eventual correction to speed impediment
  Securely negotiates through firewalls
  Supports .NET and J2EE clients FIG. 18 illustrates an overview of the EDA Server/Client message flow. E132 Authentication is responsible for the Security Socket Layer and certificate exchange. Authentication is also used to verify that a given client is allowed to communicate to a specific equipment. The Authorization aspect of E132 verifies that a specific client making a specific request for a service is authorized to request that service. Access Control List (ACL) entries are data structures that describe which entities can be authorized on an equipment. ACL entries can be of two types: RoleAssignments or PrivilegeAssignments. Roles allow you to define certain sets of privileges. An ACL entry with that role then implies a set of privileges. For example, it is possible to set up an OperatorRole Assignment that describes the privileges relevant for an operator. An ACL entry can also be an explicit list of privileges, The EDA Interface includes an attribute to specify the path/filename of the persisted ACL access settings. If, for some reason, the file does not exist, or if there is an error reading the ACL file, the EDA interface will load the default ACL entries. This allows a default, yet modifiable set of ACL entries. The default ACL entries include 4 built in PrivilegeAssignments, 4 built in RoleAssignments and 3 built in ClientIDs as follows. PrivilegeAssignment IDs: E132Administrator (full E132, E125), E134Administrator (basic E132, full E134, E125), E134PowerUser (basic E132, mid E134, E125), DefaultUser (basic E132, basic E134, E125). RoleAssignment IDs:, E132Admin—(E132Administrator), E134Admin—(E134Administrator), E134Power—(E134PowerUser), Urn:semi-org:auth:any-Prinicipal—reserved, default entry. ClientIDs: E132Admin, E134Admin, E134Power.

Any other clientID basically gets DefaultUser access. The Access Control List may be modified remotely by an E132 Administrator using E132 functionality. Additionally, an Access Control List file may be created or modified locally using the E132Adm utility. A client may request that an established session must be persistent. This means that if the equipment stops for any reason, the session will be frozen. When the equipment restarts, the session will be restarted.

In order to meet the EDA related SEMI requirements, the present invention utilizes the following building blocks for a comprehensive EDA solution.
  HTTP(s): Hypertext Transfer Protocol
  SSL: Secure Socket Layer ('s' in HTTPS) with WSDL: Web Service Definition Language
  SOAP: Simple Object Access Protocol
  EDA related Schemas EDA specifies that HTTP is used as the transport mechanism for SOAP EDA messages. Consequently, web server or web server functionality is needed to receive the inbound http messages. In a preferred embodiment of the present invention, an EDA-enabled equipment server uses Microsoft IIS Web Server.

Figure 19:
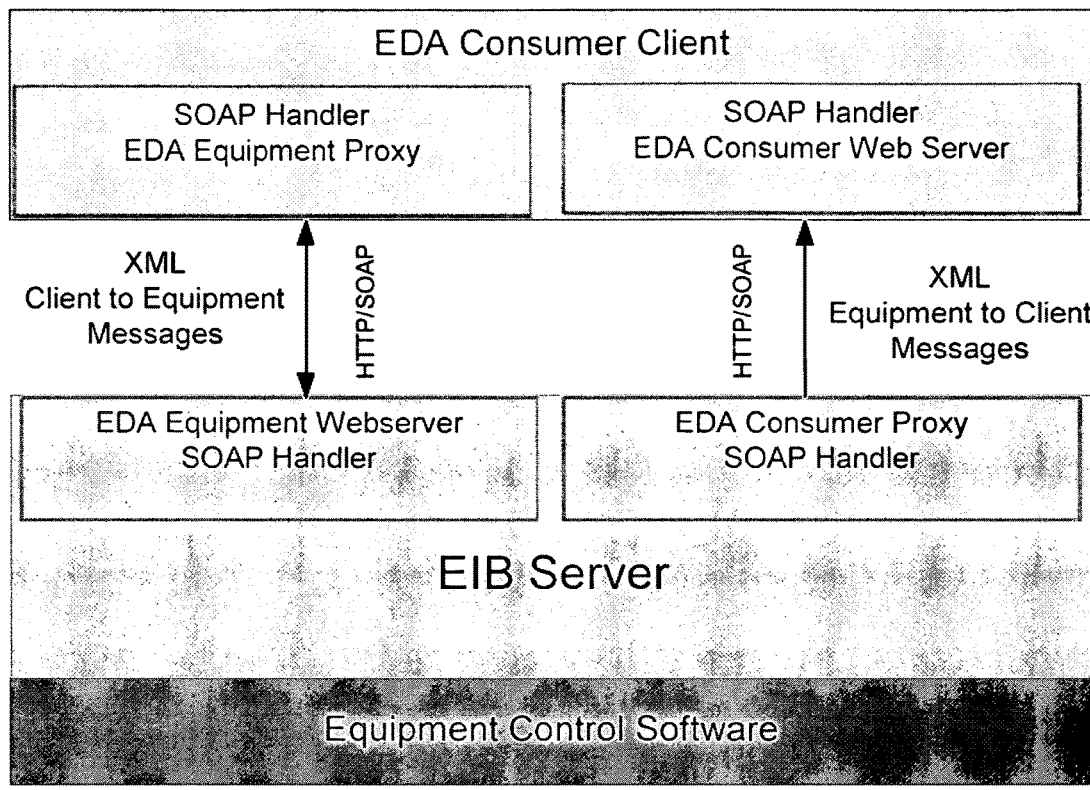
FIG. 19 illustrates communication between a client and the equipment server in an embodiment of the present invention.

The EDA architecture of the present invention is a server/client relationship, with the client using an HTTP/SOAP gateway. The general architectural views of this configuration is shown in FIG. 19. Each implementation specification (SEMI E132.1, E125.1, E134.1) uses Web Service Description Languages (WSDLs) to explicitly describe their interface. The World Wide Web Consortium (W3C) describes WSDLs as "an XML format for describing network services as a set of endpoints operating on messages containing either documentoriented or procedure-oriented information."

There is one WSDL for each WebService which describes the functionality of the WebService. A client can use that to build a proxy to talk to the web service. In the case of EDA, however, there are two sets of WSDLs for each of the EDA related SEMI implementation standards (SEMI E132.1, E125.1 and E134.1). One WSDL is for the equipment and one for the client. In all cases, the equipment's web service implements functionality directed by the equipment WSDL. The Client WSDL is used by the equipment to generate a proxy for communicating to the Client. This functionality is embodied in the EDA server. Similarly, the Client web service implements functionality directed by the Client WSDL and uses the equipment WSDL to generate a proxy for communicating with the equipment server. This client functionality can be generated from the SEMI standard WSDLs.

Host/Client API.

The Host/Client to Server communication is governed by an Application Program Interface (API) that defines methods that external applications invoke via .NET, DCOM, a direct connection, indirectly through HTTP/SOAP, SECS, or Custom Protocols to interact with the objects in an equipment object model.

The interface IBaseObject is in the package Acs.EIB.framework. IBaseObject defines the basic object features common to all objects. The interface IBaseObject in the package Acs.EIB.Framework defines the basic object features common to all objects. The interface INameable in the package Acs.EIB.Framework defines the minimum features of any object that is visible as part of the object model and has the ability to have child objects.

As described above, an object model is a hierarchical data model. The objects in an object model and their attributes reveal the structure and operational data of interest for a particular semiconductor manufacturing tool. At run-time, the present invention acts as a server, receiving queries from and sending information about attribute values in the CEM object model to client applications.

The GetChildren( ) method is used to get information about children of a particular object. This method returns an array of all children of the object the command is directed towards. An object can also be found by using its object specifier. The GetObject( ) method retrieves a single object from the object model. The object specifier is a string that represents the location of the object in the CEM model starting with this node. It consists of the name of each object on the path from the current object to the desired object separated by either a '>' (SEMI E39 format) or a '/' (CEM format). For example:

INameable childObject=obj.GetObject("Module1>Submodule2");

This example retrieves a child object called Submodule2 from the object Module1 that is a child of obj (note that obj must have a valid reference to an INameable).

The INameable interface provides the GetChild( ) method to retrieve a reference to a direct child of the object. The method requires the name of the child to retrieve.

The object model of the present invention provides a significant number of attributes to describe each object in the model. The attributes provided in the object model are based on the SEMI CEM standard with some additional attributes provided. For information that does not fit one of the existing attributes, new attributes may be added to each object instance.

The attributes in the object model must obtain values from a source. An attribute source is the system that supplies the data stored in an attribute. In general, the sources of attribute values are: static attributes from the XML document, dynamic attributes retrieved from the tool, and dynamic attributes set from a host application.

Static attributes are essentially read-only attributes that never change. All of the attributes defined in CEM are considered read-only attributes. Other attributes in the model may also be static. Note that it is actually possible for CEM attributes to change when a module is replaced on a tool, the tool is re-configured, or other significant modification to the hardware occurs. These attributes are still considered static.

Dynamic attributes are attributes that change over time. These attributes must have a source that changes the attribute value. This source may be internal to the equipment server or from the tool. Dynamic attributes may be read-only or readwrite from the host. Read-only attributes may only be changed by a tool application. The host is not allowed to alter the value of these attributes. Read-write attributes may be changed either by a host or by a tool application.

The IBaseObject interface provides the GetAttributeNames method to retrieve a string array of the names of the attributes available on an object. This array will contain one entry for each attribute name defined for the instance of the object.

There are several methods available for retrieving attribute values. Each object has a set of methods that allow the value of each attribute to be retrieved. Additionally, there are methods to set the value of each of the readwrite attributes. For instance, the serviceState attribute has the method GetServiceState to retrieve the value of the serviceState attribute. Since serviceState is read-only, no SetServiceState method exists.

The IBaseObject interface defines methods for getting and setting attributes using the name of the attribute as a parameter. The method GetAttributeValue retrieves the value of a single attribute from the object. The method GetAttributeValues retrieves the value of multiple attributes from the object. For setting attributes, similar methods SetAttributeValue and setAttributeValues exist. The IBaseObject interface also defines methods for retrieving or setting multiple attributes across multiple objects. The method GetMultipleObjectAttributeValues retrieves the values of multiple attributes in multiple objects and the SetMultipleObjectAttributeValues set the values of multiple attributes in multiple objects. These methods are offered to reduce requests and provide atomic operations.

Events. The Host/Client API enables you to register listeners for notification in the event that an attribute value of an object in the object model is set. If a listener is registered to receive notification when the attribute value is set, the object adds the listener to a list at the time of registration and then notifies the listener of the old and new value of the attribute when it is set. A host application adds a listener to an attribute by calling AddAttributeSetListener. The equipment server will then notify the client by executing the AttributeSet method on the listener.

An embodiment of the present invention also has several event objects defined. Each of these event objects is based on IBaseEvent. The API enables the registration of listeners for notification when the event triggers. If a listener is registered to receive notification when the event triggers, the object adds the listener to a list at the time of registration and then notifies the listener when the event occurs. A listener has the ability to attach a report to the event. A report contains a list of IBaseEvent attributes that should be provided when the event triggers. The notification will report the value of each IBaseObject attribute requested in the report. A host application adds a listener to an attribute by calling AddEventListener. The equipment server will then notify the client by executing the EventTriggered method on the listener.

Recipes. All objects based on the IAbstractModule interface may have the ability to execute recipes. An object must support recipes in a manner that is compatible with recipe management as specified in the SEMI E30 standard. A host application-performs recipe actions by retrieving a reference to the IRecipeExecutor by calling GetRecipeExecutor. The IRecipeExecutor provides methods for uploading, downloading, listing, deleting, and selecting recipes. A host application may register as a provider for recipes. A host provider is a host application that is responsible for recipe upload and download requests from the tool. The host registers as a host recipe provider by calling SetToHostRecipeHandler with an object that implements IToHostRecipeHandler.

WaferMaps. All objects based on the IAbstractModule interface may have the ability to execute WaferMaps. The WaferMap object contains attributes for each SECS Element associated WaferMaps as specified in the SEMI E5 standard (BinList, XDieSize, etc.). The properties will be writeable if there are situations where the information is provided by the host. A host application performs Wafermap actions by retrieving a reference to the IWaferMapExecutor by calling GetWaferMapExecutor. The IWaferMapExecutor provides methods for uploading, downloading and reporting WaferMap errors. A host application may register as a provider for WaferMaps. A host provider is a host application that is responsible for uploadSend (receiving a WaferMap) and downloadRequest (providing a WaferMap) from the tool. The host registers as a host WaferMap provider by calling SetToHostWaferMapHandler with an object that implements IToHostWaferMapHandler.

Commands. Most objects in the object model support commands. Commands on objects can be broken into two groups. In the first group are internal commands implemented by EIB. These commands will exist on all objects of a specific type. In the second group of commands are remote commands. Remote commands are commands that must be handled by the tool controller software. The Remote Commands available depend on the tool implementation. A list of the available commands for an object may be obtained by calling the object services GetServiceName on ApplicationRoot or by calling GetCommandNames on the object instance. Similarly, a list of command parameters may be obtained by calling the object services GetServiceParameterData on ApplicationRoot or by calling GetCommandParameters on the object instance. Note that Object Services uses object types rather than object instances when requesting command and parameter names. The present invention allows objects of the same type to have different commands and parameters. If the tool model has different commands on the same object type, the Object Services methods may not return the correct information.

The present invention provides several methods of executing commands. From ApplicationRoot, an object services ObjectAction can be executed on any object in the model. From the object reference, any command defined in the CEM standard may be executed by calling the command directly. All commands may be executed from an object reference by calling ExecuteCommand with the name of the command to execute.

Tool/Data Agent to Server Communication

Figure 20:
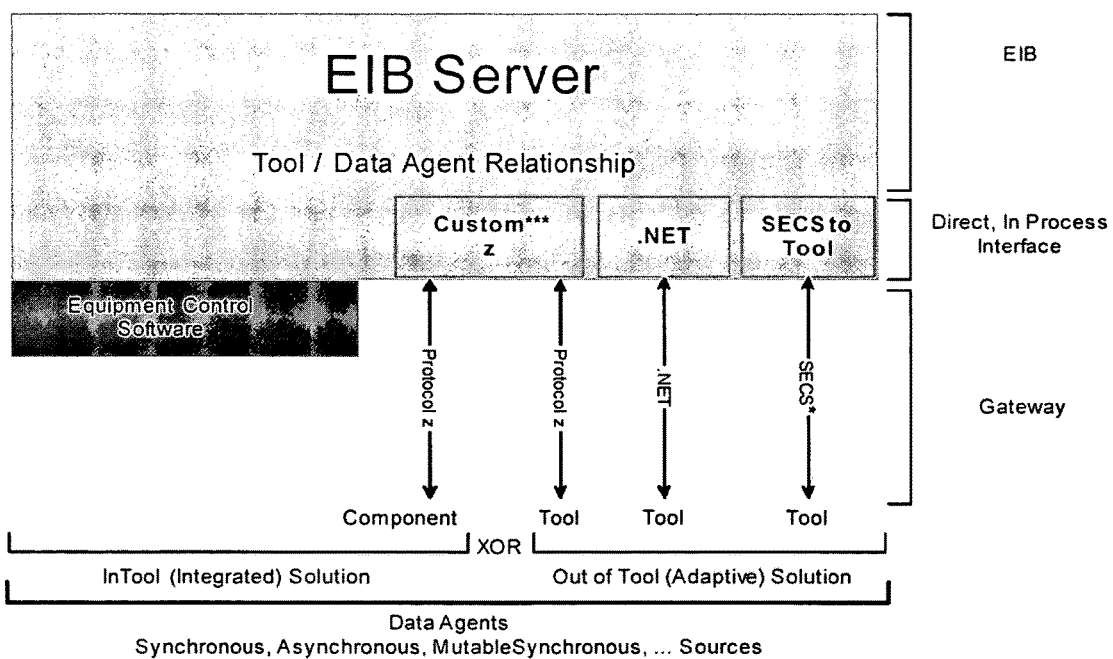
FIG. 20 illustrates the tool/data agent relationship of an embodiment of the present invention.

As illustrated in FIG. 20, a preferred embodiment of the present invention includes SECS/GEM, .NET and Custom interfaces that enable communication between the equipment server and other sources or data agents, such as equipment control software (internal), tools and tool components (external).

Internal Direct Connection. An internal custom interface is an interface that directly connects to the equipment server. An easy to use framework is provided for direct connectivity into the equipment server. This framework provides a system for starting the interface, connecting the custom interface to the equipment server, and for configuring the interface.

.NET Interface. The .NET client interface allows a .NET enabled program running on one computer to access the objects and methods of another program running on a different computer using object serialization. Object serialization allows the passage of complex data structures over a network without writing any code to reconstruct them.

The .NET Remoting Interface is the most fundamental gateway used to connect to the equipment server of the present invention. This framework allows objects to interact with one another between remote client and server applications. This external interface connects to the equipment server using a .NET connection from a tool or data agent. When starting an external interface, the interface application will need to verify that the equipment server is running by opening a connection to the equipment server. The interface will register as a source with each object that the interface will provide data to or receive commands from within the object model.

More information about the .NET interface is described above in connection with Host/Client interfacing.

SECS/GEM Interface. A preferred embodiment of the present invention includes a "to tool" SECS/GEM interface that enables communication between the equipment server and tools or other data agents that rely on SECS/GEM protocols. A set of SECS/GEM interfaces is provided that enable communication between objects and other applications, such as tool control software, that rely on SECS/GEM protocols.

Also supported is the High Speed SECS Messages Services Single Session Mode (HSMS-SS) per the SEMI E37 standard. With HSMS-SS, an Ethernet connection can be used for communications with the tool, instead of the tool's serial communications port. This capability also enables an object model to be tested without using the tool's serial communications port.

A preferred embodiment of the present invention provides GEM capability by implementing the most commonly used GEM messages. Older SECS based tools can be used and will provide a GEM compliant interface to the host.

Objects can send data to the host from the object model through the GEM interface. The data items specified are used in the SECS messages supported by the implementation of the GEM standard, SEMI E30. The GEM interface communicates specific values for certain acknowledge codes in the SECS messages that are supported. By specifying these values in the interface code, the present invention presents a standard set of acknowledge code values to the host for every tool that uses the equipment server. The SECS/GEM interface from the tool to the object model uses these same acknowledge codes and values.

The SECS/GEM Interfaces are configured to allow communication with a SECS/GEM compliant interface on a tool. The following elements are part of the SECS/GEM Interface:

Connection One of the following: GEMConnection, S1F1 Connection (only in toTool), LMConnection (only in toTool), LoopbackConnection
ElementFormats (required in ToTool and not in toHost)
Clock optional
ProcessPrograms
WaferMapService
RemoteControl
StatusVariables
EquipmentConstants
DataVariables
DataCollection
TraceDataCollection
Alarms
TerminalServices
CustomSources (only in toTool)
IntemalGEMIDs (only in toHost)
UnrecognizedMessages Configuration of the Host GEM Interface and the Tool SECS/GEM interface is performed in the same XML file as the CEM EibModel Model definition, but in completely isolated sections of the XML document. The restrictions that exist in the XML document is there are no components of any interface embedded in the CEM model for the tool and all connections in the interfaces to the CEM model are performed using full object specifiers. The advantage of this is it allows for easy definition of new interfaces. The major drawback is properly linking the SECS items to the objects in the model. Moving objects around in the model requires re-linking the affected SECS/GEM items. It also requires significant navigation inside the XML while creating it. Note that Model Builder will automatically correct all linkage between interfaces and the object model when objects are moved. Thus, this is only an issue when models are edited manually.

To configure the SECS/GEM interfaces for an object model, the following tasks are performed to complete the configuration:

Specify the names of the interfaces in the process instructions section of the XML file.

Configure communication parameters for each interface. For example, whether an HSMS-SS or SECS serial port connection is being used for each interface and whether the SECS connection to the tool is a GEM connection or an S1F1 connection.

For the SECS interface from equipment server to the tool, specify data types for the SECS data items and configure optional functionality, such as trace data collection and predefined reports that the tool supports.

Map status variables, equipment constants, data variables and collection events to specific objects and attributes in your object model. Mapping SECS variables and events to EibModel objects and attributes is one of the more difficult configuration tasks in setting up a SECS interface. Each attribute in an EibModel object may be tied to one or more SECS configuration items. The CEM model must include an object and property pair for any event or variable that is to be reported to the host. These object and property pairs must be linked to the host GEM interface (if it is present) and the tool SECS/GEM interface (if it is present).

Specify which remote commands, if any, are supported by the tool for the Equipment and/or EquipmentModule objects. A Remote command is any command that must be sent to the tool ECS to be properly handled.

Specify which object in your model is the recipeExecutor, if applicable to your model Specify which object in your model is the waferMapExecutor, if applicable to your model.

Specify the exception manager and the exception conditions defined for the exception manager. Mapping SECS alarms to EibModel ExceptionCondition objects is straightforward. The object model must include an ExceptionCondition object for any alarm that you want to report to the host. These ExceptionCondition objects must be linked to the host GEM interface (if it is present) and the tool SECS/GEM interface (if it is present).

Custom Handlers in SECS/GEM Interface. The present invention allows for the definition of custom message handlers in the tool SECS interface. Custom message handlers may be used to handle any SECS message that is not directly supported by the Tool SECS Interface. The Tool SECS interface supports two different kinds of custom message handlers, one for commands and one for data. Custom handlers in EIB may be written in any .NET language. This includes C#, VB#, and any other language fully compliant with the Microsoft Common Language Runtime (CLR).

A custom SECS Command handler is a handler that receives remote commands from the equipment server, builds a custom SECS message based on the command received, and sends the message to the tool. The Tool SECS Interface allows for the definition of one custom SECS Command handler. This command handler is responsible for building and sending custom SECS messages for all remote commands requiring a custom message handler.

A custom SECS message handler is a handler that receives data requests from the equipment server and makes a request to the tool using a custom SECS message (synchronous data request), or receives a custom a custom SECS message from the tool and updates data (asynchronous data), or both. The Tool SECS Interface may have any number of custom SECS message handlers defined.

An asynchronous custom SECS Message Handler is responsible for receiving a custom SECS message from the tool and asynchronously updating information in the equipment server. To be an asynchronous source, the custom handler must also implement the IAsynchronousSource interface directly or in an inner class. The InitializeElement method will need to register as an asynchronous source for the object. If the custom handler is providing an event, it should call SetAsynchronousSource passing either itself or the inner class. The Custom SECS Message Handler will then call trigger on the event when the custom SECS message is received. If the custom handler is a source for an attribute, it should call SetAsynchronousSource with the attribute name and itself or the inner class. The Custom SECS Message Handler will then call SetAttributeFromSource for the attribute on the object when the custom SECS message is received. More detail on handling of events and asynchronous sources is discussed below with respect to the Tool/Data Agent API.

A Custom SECS Message Handler may be a synchronous source or a mutable synchronous source for any IBaseObject. A synchronous custom SECS Message Handler is responsible for sending a custom SECS message when the value of an attribute is requested. To be a synchronous source, the custom handler must also implement the ISynchronousSource interface directly or in an inner class. The InitializeElement method will need to register as a synchronous source for the object. The custom handler must implement the GetValue methods (either directly or in an inner class) described in the ISynchronousSource interface. These methods will need to build the custom SECS message required to retrieve the requested data, send it, and return the data from the reply. All errors are returned by throwing an exception that describes the error. A mutable synchronous custom SECS Message Handler is responsible for sending a new value to the tool for an attribute using a SECS message when the attribute is set in addition to requesting the value from the tool.

To be a mutable synchronous source, the custom handler must also implement the IMutableSynchronousSource interface directly or in an inner class. The InitializeElement method will need to register as a mutable synchronous source for the object. The custom handler must implement the SetValue methods (either directly or in an inner class) described in the IMutableSynchronousSource interface in addition to the GetValue methods in ISynchronousSource. These methods will need to build the custom SECS message required to set the supplied data, send it, and receive the reply. All errors are returned by throwing an exception that describes the error.

Custom Interface. The present invention can support any number of custom interfaces added on to the tool. An internal custom interface is a interface that runs within the equipment server as shown in FIG. 20 as interface z.

The present invention allows any number of custom interfaces to be added in one of two ways: directly into the server, or as a client over .NET. Custom interfaces can be developed to handle unique tool or component situations.

An Internal Custom Interface is a custom interface that runs within the equipment server. An easy way is provided to use framework for adding custom interfaces directly into the equipment server. This framework provides a system for starting the interface, connecting the custom interface to the equipment server, and for configuring the interface. Custom Internal Interfaces must be written in C# and compiled to a location that the equipment server can locate at runtime.

A schema needs to be created to represent a custom interface. This schema describes the valid content of your custom interface definition. The amount of information placed in the schema depends on the amount of configuration required for the custom interface. The schema must have one element defined in it with a name that ends with Interface. For example, a custom interface to a scribe tool made by the Acme Company might be named AcmeScribeInterface.

In a preferred embodiment of the present invention, the following attributed with associated data types are the minimum requirements for a custom interface:

name (string): Name of the interface (Must be unique among all children objects on Root)

className (string): Defines the class name of the XMLFactory that has the ability to parse this custom schema. This attribute must be declared as fixed in your schema and the value must be specified.

Additional attribute may be added as needed for a custom interface. The remaining content of the interface element depends solely on the interface design. Any number of complex types may be defined in the schema.

The XML Factory is a class defined in the custom interface that is responsible for building and configuring your custom interface. This factory will be responsible for creating (at minimum) the main object for your interface (see Custom Interface Object below). The XML Factory must implement the IXMLFactory interface (see IXMLFactory in the Custom Interface Documentation). The IXMLFactory interface defines four methods that must be implemented in your factory.

The Initialize method is called when the equipment server is initially starts up. The factory should perform any setup it requires prior to processing the XML document. A reference to the ApplicationRoot object for this instance will be provided. This reference will allow full access to the Eib-Model model by the factory.

The StartElement method is called for every element read from the XML document. EIB calls all factories with all elements it reads from the XML document. Your factory must validate that the elements being processed are meaningful to the factory. Typically, a factory should verify that the namespace for the element matches the namespace expected by the factory. Further, your factory should verify that the parent Interface element has the expected name. If the name does not match, the factory needs to ignore the current content. This allows a single factory to generate multiple interfaces with different names.

The EndElement is called at the end of every element read from the XML document. All factories are called when the end of an element is reached. The factory must validate that the elements being processed are meaningful to the factory. Typically, a factory should verify that the namespace for the element matches the namespace expected by the factory.

The EndDocument is called at the end of the XML Document. It is called after all information is read from the document. The factory should perform any configuration that must occur after all information is read from the XML Document. At a minimum, if the interface object for this interface has not been added to ApplicationRoot, this method should call AddInterface on ApplicationRoot).

All Interfaces to the equipment server (both internal and custom) have a main object that represents the interface. This main object for your interface must extend com.asyst.core.CommInterface. The XMLFactory must create this object at some point while the XML document is being read. It does not matter when the XMLFactory creates the object as long as it is created before EndDocument completes. The base class for com.asyst.core.CommInterface defines the name for the interface. This name must be set to the name for the interface. It uniquely identifies this instance of the interface in the equipment server. Note that the custom interface must either extend an object that extends C#.MarshalByRefObject or extend c#.MarshalByRefObject itself.

A preferred embodiment of the present invention loads a custom interface at startup by reading an XML document that describes the tool model and all of the interfaces to the tool model. Configuration information about the custom interface must be placed in the XML Document. The content of the XML Document for the interface depends on the schema and the custom interface implementation. The minimal information should include the name for the interface. In a preferred embodiment, Model Builder described above can perform the steps to add and configure a customer interface.

A provided ASCII interface structure is very similar to the To-Tool SECS interface, with the exception that it is for tools that communicate with ASCII messages. There are a group of services that use a connection object to send and receive messages with the tool. This connection object then uses Ports to actually send the messages. One significant difference is the ASCII Interface requires custom code. Since there is no established format for the messages, it is impossible to write a full implementation.

The following ports have been implemented:
ASCIISerialPort—communicates using a serial port
ASCIITcpPort—communicates using a TCP/IP connection
ASCIIPortConnection—base connection with no connection logic
ASCIIEstablishCommConnection—connection that requires an established communications connection.
ASCIIOnlineConnection—connection that requires an online exchange The ASCIIEstablishCommConnection and ASCIIOnlineConnection both require the addition of custom code to function correctly.

The following services have been defined:
DataCollectionService—For asynchronous data collection (events and vars)
EquipmentConstantService—For retrieving and setting configuration vars
StatusVariableService—For retrieving synchronous status data
RemoteControl—For sending commands Each of these requires some custom code for them to function correctly with the tool. RemoteControl is the most developed of the services. For some tools, it will only require a reply message handler. Supporting this is the definition of a VariableStore, EventStore, and CommandStore. A schema called AsciiInterface has been added for the Ascii interface. This schema defines options that are supported by default. This schema has been setup to work with Model Builder.

Tool/Data Agent API.

The tool to server communication is governed by an Application Program Interface (API) that describes the methods that external tools invoke via objects, a direct connection, an indirect connection through SECS or custom protocols.

As described above, an equipment object model of the present invention is a hierarchical data model. The objects in an equipment object model and their attributes reveal the structure and operational data of interest for a particular semiconductor manufacturing tool. At run-time, the equipment server acts as a client, making requests of a tool or component data agent to get or set values, etc. to be used to populate the object model.

Information about children of a particular object can be retrieved using the GetChildren( ) method. This method returns an array of all children of the object the command is directed towards. It is also possible to find an object by using its object specifier. The GetObject( ) method retrieves a single object from the object model. The object specifier is a string that represents the location of the object in the CEM model starting with this node. It consists of the name of each object on the path from the current object to the desired object separated by either a '>' (SEMI E39 format) or a '/' (CEM format). For example:

INameable childObject=obj.getObject ("Module1>Submodule2");

This example retrieves a child object called Submodule2 from the object Module1 that is a child of obj (note that obj must have a valid reference to INameable).

A reference to a direct child of an object can be retrieved by using the getchild( ) method that he INameable class provides. The method requires the name of the child to retrieve.

The equipment model of the present invention provides a significant number of attributes for describing each object in the model. The attributes provided are based on the SEMI CEM standard as well as some additional attributes. For information that does not fit in one of the existing attributes, new attributes may be added to each object instance.

The attributes in the object model must obtain values from a source. An attribute source is the system that supplies the data stored in an attribute. In general, the sources of attribute values are one of the following:

Static attributes from the XML document
Dynamic attributes retrieved from the tool or component
Dynamic attributes set from a host application Static attributes are essentially read-only attributes that never change. All of the attributes defined in CEM are considered read-only attributes. These attributes are set in the XML document for the tool. Note that it is actually possible for CEM attributes to change when a module is replaced on a tool, the tool is re-configured, or other significant modification to the hardware occurs. These attributes are still considered static. Changes of this type must be performed by editing the XML Document representing the tool.

Dynamic attributes are attributes that change over time. These attribute must have a source that changes the attribute value. This source may be internal to the equipment server, a host application or the tool. The description that follows illustrates methods available for the tool to provide attribute data sources and to receive changes made by host applications.

Synchronous Source. A synchronous source gets a value from the synchronous source every time the value of the attribute is requested. The value is retrieved immediately from the attribute source. For example, an observable for temperature would have a synchronous source for its value. The tool must register as the source of this attribute so that when the object is queried for the value, it calls the registered synchronous source. The tool application does this by creating a class that implements the interface Acs.EIB.framework.ISynchronousSource and registering it as the source of the attribute. The tool registers this class as the source by calling SetSynchronousSource( ) on the IBaseObject with the attribute name and the object that will provide the source.

A registered synchronous source must implement the GetValue methods in ISynchronousSource to retrieve the attribute value(s). The equipment server will now call this object every time the value of the attribute is requested. Note that an object implementing ISynchronousSource may be the source of more than one attribute.

Mutable Synchronous Source. A mutable synchronous source is a synchronous source that also allows the equipment server to change an attribute value. A mutable synchronous source gets a value from the mutable synchronous source every time the value of the attribute is requested and sets the value on the mutable synchronous source every time it is set. For example, an observable for MaxAllowedPressure could have a mutable synchronous source for its value. The tool must register as the source of this attribute so that when the object is queried for the value, it calls the registered synchronous source, and when it is set, the mutable synchronous source is notified of the new value. The tool application does this by creating a class that implements the interface Acs.EIB.framework.IMutableSynchronousSource and registering it as the source of the attribute.

A tool registers this class as the source by calling SetMutableSynchronousSource( ) on the IBaseObject with the attribute name and the object that will provide the source. The registered mutable synchronous source must implement the GetValue and SetValue methods in IMutableSynchronousSource to retrieve the attribute value(s). The equipment server will now call this object every time the value of the attribute is requested. Note that an object implementing IMutableSynchronousSource may be the source of more than one attribute.

Asynchronous Source. This interface is intended to allow the IBaseObject to contain attributes that correspond to data variables on equipment. Data variables on the equipment are variables that are asynchronously updated by the equipment when the value of the attribute changes. If the attribute changes at the same time as one or more IBaseEvent objects, the IEventSource interface should also be implemented by this source. The IAsynchronousSource is enabled by calling IBaseObject.AddAttributeSetListener. Enabling the IAsynchronousSource invokes one of the IAsynchronousSource.Start methods. When the attributes are no longer needed, the IAsynchronousSource is disabled by calling IBaseObject.RemoveAttributeSetListener. Disabling the IAsynchronousSource invokes one of the IAsynchronousSource. Stop methods.

There are three methods that a source client may use to keep an attribute up to date. These are:

As needed based on events

Always

As need regardless of events

Updating as needed based on events is the most time efficient mechanism of reporting the data but requires a more complex IAsychronousSource. This system assumes that the real source of data is a separate application that must be communicated with. Further, it is optimized for high-bandwidth data reporting where configuration requires an insignificant amount of the bandwidth compared to reporting of the data. This system requires that the IAsynchronousSource track the number of references to the data. It also requires that the source implement IEventSource in addition to IAsychronousSource.

When a source client updates one or more attributes as needed by clients, the source must track all calls to the IAsynchronousSource.Start and IAsynchronousSource.Stop methods. Every time a call is made to Start, the source must check the state of that attribute. If data collection for that attribute has not been enabled, the source must perform all actions required to setup the collection of the data. The actual actions required depend on the source. Note that if it is possible to collect the data for this attribute in more than one way, then all ways should be enabled (unless the other ways are completely redundant and always occur at the same instances in time) so the value of this attribute is updated as often as possible. Once all actions have been completed successfully, call IBaseObject.ConnectAsynchronousSource to notify the IBaseObject that the source will begin supplying the data. Note that the value of the attribute is not considered valid until the source sets the attribute value using IBaseObject.SetAttributeFromSource at least once. This is done to support sources that may not be able to report the current value of the attribute immediately. Every time a call is made to Stop, the source must check to see if this was the last reference to the attribute. If it is, it should perform all actions necessary to terminate collecting the data, then it must call IBaseObject.DisconnectAsynchronousSource to notify the IBaseObject that the source will no longer supply the data. The value of the attribute will instantly become invalid.

Figure 21:
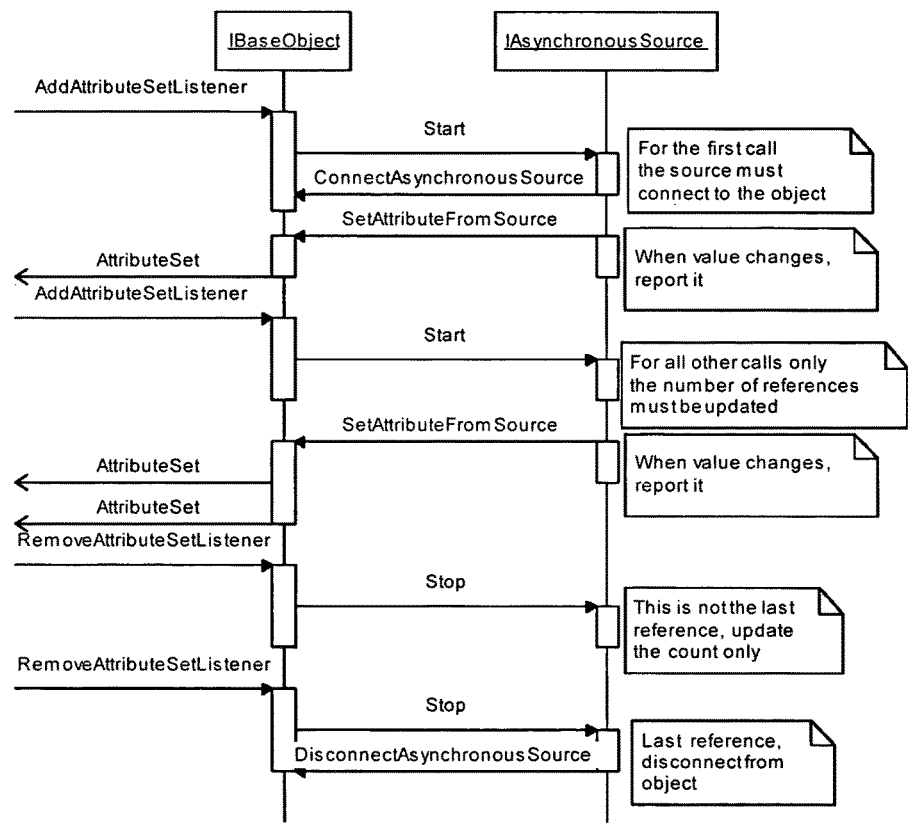
FIG. 21 illustrates communication between an asynchronous source and the equipment server in an embodiment of the present invention.

FIG. 21 illustrates the actions that must be taken by the source. Note that this figure does not detail any of the actual actions taken within IBaseObject.

Some asynchronous sources may continually provide data regardless of interest in the data. These sources should call IBaseObject.ConnectAsynchronousSource as soon as they are ready to begin supplying data. They may then ignore the Start and Stop methods (These methods must still be implemented; they just will not perform any actions). At any time, if the source stops providing data, it must call IBaseObject.DisconnectAsynchronousSource to inform the attribute that it is no longer supplying the data.

Figure 22:
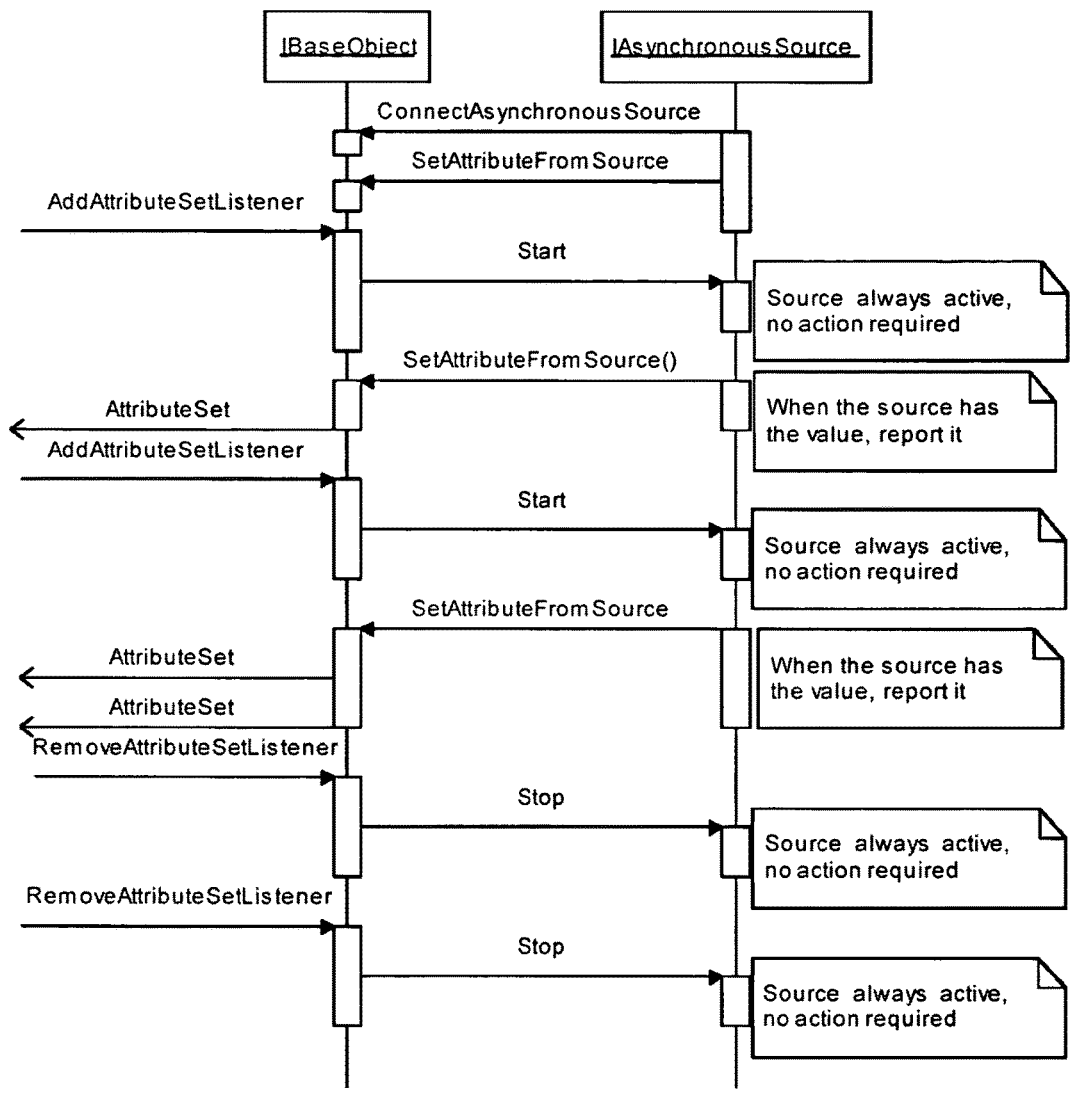
FIG. 22 illustrates communication between an asynchronous source and the equipment server in an embodiment of the present invention.

FIG. 22 illustrates the actions that must be taken by the source. Note that this figure does not detail any of the actual actions taken within IBaseObject.

Updating as needed regardless of events provides a good compromise between source client complexity and bandwidth requirements. This system assumes that the real source of data is a separate application that must be communicated with. This system does not require that the IAsynchronousSource track the number of references to the data. The primary difference between this system and updating values based on events is all possible sources (events, etc.) for an attribute must be enabled even if only one or a few would be required to satisfy the need.

When a source client updates one or more attributes regardless of events, the source will receive a call to IAsynchronousSource.Start when the first listener is added to the attribute and a call to IAsynchronousSource.Stop when the last listener is removed from the attribute. When a call is made to Start, the source must perform all actions required to setup the collection of the data. The actual actions required depend on the source. Note that if it is possible to collect the data for this attribute in more than one way, then all ways should be enabled (unless the other ways are completely redundant and always occur at the same instances in time) so the value of this attribute is updated as often as possible. Once all actions have been completed successfully, call IBaseObject.ConnectAsynchronousSource to notify the IBaseObject that the source will begin supplying the data. Note that the value of the attribute is not considered valid until the source sets the attribute value using IBaseObject.SetAttributeFromSource at least once. This is done to support sources that may not be able to report the current value of the attribute immediately. When a call is made to Stop, the source must perform all actions necessary to terminate collecting the data, then it must call IBaseObject.DisconnectAsynchronousSource to notify the IBaseObject that the source will no longer supply the data. The value of the attribute will instantly become invalid.

Figure 23:
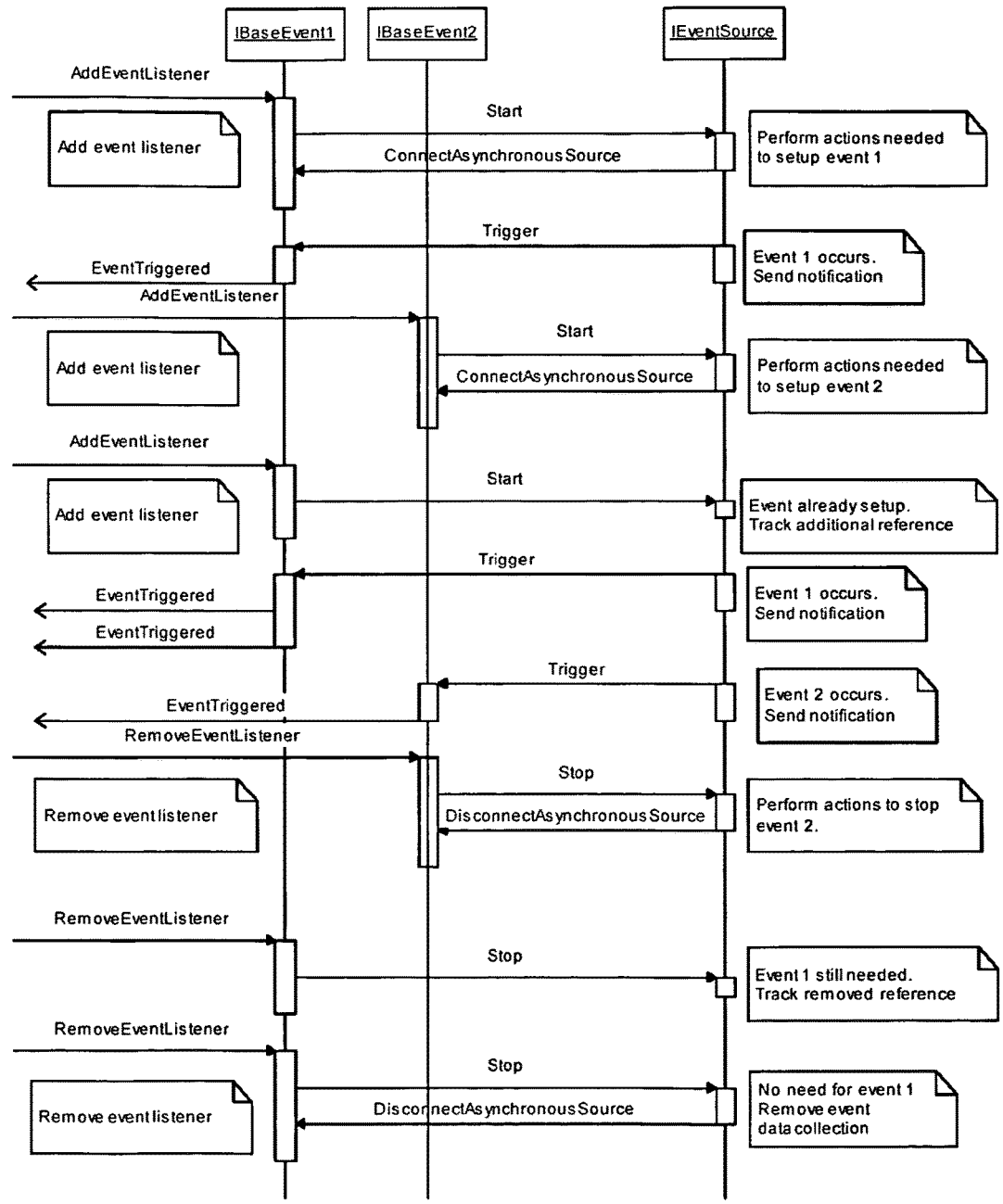
FIG. 23 illustrates communication between an asynchronous source and the equipment server in an embodiment of the present invention.

FIG. 23 illustrates the actions that must be taken by the source. Note that this drawing does not detail any of the actual actions taken within IBaseObject.

In many cases, an asynchronous source is communicating with an external system. It is often possible for this communication system to fail (lose the connection with the external system). It is desirable for an asynchronous source to not report a communication failure as an error (an exception). Generating exceptions should be limited to invalid information in the Start or Stop. For a communication failure, it is better to only log the communication failure and cache the configuration information. Once communication is restored, the configuration information can then be sent to the external system. This allows a host data client to subscribe to data even when communication is down, then begin receiving the data when communication is restored. There may be instances where this is not desirable or not practical. In these cases, a communication failure should generate an exception.

Trace Source. A trace source is a source that is capable of periodically providing the value of an attribute. The tool registers as the trace source of this attribute so that trace source is notified when a trace is setup on the attribute. The tool application does this by creating a class that implements the interface Acs.EIB.framework.ITraceSource and registering it as the source of the attribute. The tool registers this class as the source by calling SetTraceSource( ) on the IBaseObject with the attribute name and the object that will provide the source. The registered trace source implements the start and stop methods in ITraceSource to start and stop trace data reporting. The equipment server will now call this object when a trace is setup that includes the attribute or when the trace is removed from the attribute. Note that an object implementing ITraceSource may be the trace source of more than one attribute.

Recipe Executor. All objects based on the IAbstractModule interface may have the ability to execute recipes. In order to be capable of executing recipes, the object must have an IRecipeExecutor assigned to it. An object that has a recipe source can handle recipes in a manner that is compatible with recipe management as specified in the SEMI E30 standard. The tool registers with an IRecipeExecutor object which handles communication between the tool and the host with respect to recipe management by calling SetToTool-RecipeHandler with an object that implements IToToolRecipeHandler.

WaferMap Executor. All objects based on the IAbstractModule interface may have the ability to execute WaferMaps. In order to be capable of executing WaferMaps, the object must have had the WaferMap Executor functionality Added to it in ModelBuilder. In addition it must have a handler assigned to it as a WaferMap tool source. An object that has a WaferMap source can handle WaferMaps in a manner that is compatible with WaferMap management as specified in SEMI E5 standard. The tool handler registers with an IWaferMapExecutor object by calling SetToTool-WaferMapHandler with an object (handler) that implements IToToolWaferMapHandler.

Remote Commands. Remote commands are utilized to request the execution of a command implemented on a tool. For example, a remote command can be used to cause a tool to implement a command called start. As specified by the CEM standard, instances of both Equipment and EquipmentModule objects can handle remote commands. The tool must register an object that implements ICommandExecutor with each IAbstractModule that is capable of handling remote commands. This object must implement the ExecuteCommand method for executing remote commands. This object will be responsible for handling all remote commands for each IAbstractModule it registers with. Note that an object implementing ICommandExecutor may be the source of more than one module.

Terminal Services. All objects based on the IAbstractModule interface may have the ability to implement terminal services. An object that has a terminal service source can handle terminal service messages in a manner that is compatible with terminal services as specified in the SEMI E30 standard. The tool registers with an ITerminalService object which handles communication between the tool and the host with respect to terminal services by calling SetTerminalDisplayHandler with an object that implements ITerminalDisplayHandler. Note that an object implementing ITerminalDisplayHandler may be the source of more than one module.

Events. The Event interface is intended to allow the IBaseEvent to represent an event generated on the equipment. In many cases, events will also update one or more attributes in the model when the event occurs. When this is the case, the source must also implement the IAsynchronousSource interface for those attributes. The IEventSource is enabled by calling IBaseEvent.AddEventListener. Enabling the IEventSource invokes the IEventSource.Start method. When the event is no longer needed, the IEventSource is disabled by calling IBaseEvent.RemoveEventListener. Disabling the event invokes the IEventSource.Stop method.

There are three methods that a source client may use to source an event and data associated with the event. These are:
As needed based on events
Always
As needed regardless of events Updating as needed based on events is the most time efficient mechanism of reporting the data but requires a more complex IEventSource. This system assumes that the real source of data is a separate application that must be communicated with. Further, it is optimized for high-bandwidth data reporting where configuration requires an insignificant amount of the bandwidth compared to reporting of the data. This system requires that the IEventSource track the number of references to events as well as the data in the events. Tracking this allows only the required data to be reported with each event.

When a source client updates one or more events as needed by clients, the source must track all calls to the IEventSource.Start and IEventSource.Stop methods. Every time a call is made to Start, the source must check the state of the event. If data collection for that event has not been enabled, the source must perform all actions required to setup the collection of the event. If the event has a set of attributes that this source also updates, the source must determine if the attributes are also being updated by this event. If this event is not updating the attributes, the event configuration must be changed to also update the list of attributes. When a set of attributes is specified on an event, the attributes are only required to be updated on that event (plus any additional events they are already enabled on) unless collection of the attribute has been enabled using IAsynchronousSource.Start. The actual actions required depend on the source. Once all actions have been completed successfully, IBaseEvent.ConnectAsynchronousSource is called to notify the IBaseEvent that the source will begin supplying the event. This level of complexity exists to minimize the data (not configuration) that must be reported potentially over a communication mechanism between the IEventSource and the application that actually generates the data. Every time a call is made to Stop, the source must check to see if this was the last reference to the event. If it is, it should perform all actions necessary to terminate collecting the event along with the data associated with the event. Note that collection of data for an object/attribute can only be terminated for this one event. If the data is still collected on other events, it must continue to do so. If the event was not terminated, it may also check the references to each object/attribute associated with the event. If no references exist to an attribute, it may cease collection of the data for that attribute. Once all configuration is complete, it must call IBaseEvent.DisconnectAsynchronousSource to notify the IBaseEvent that the source will no longer supply the event.

Figure 24:
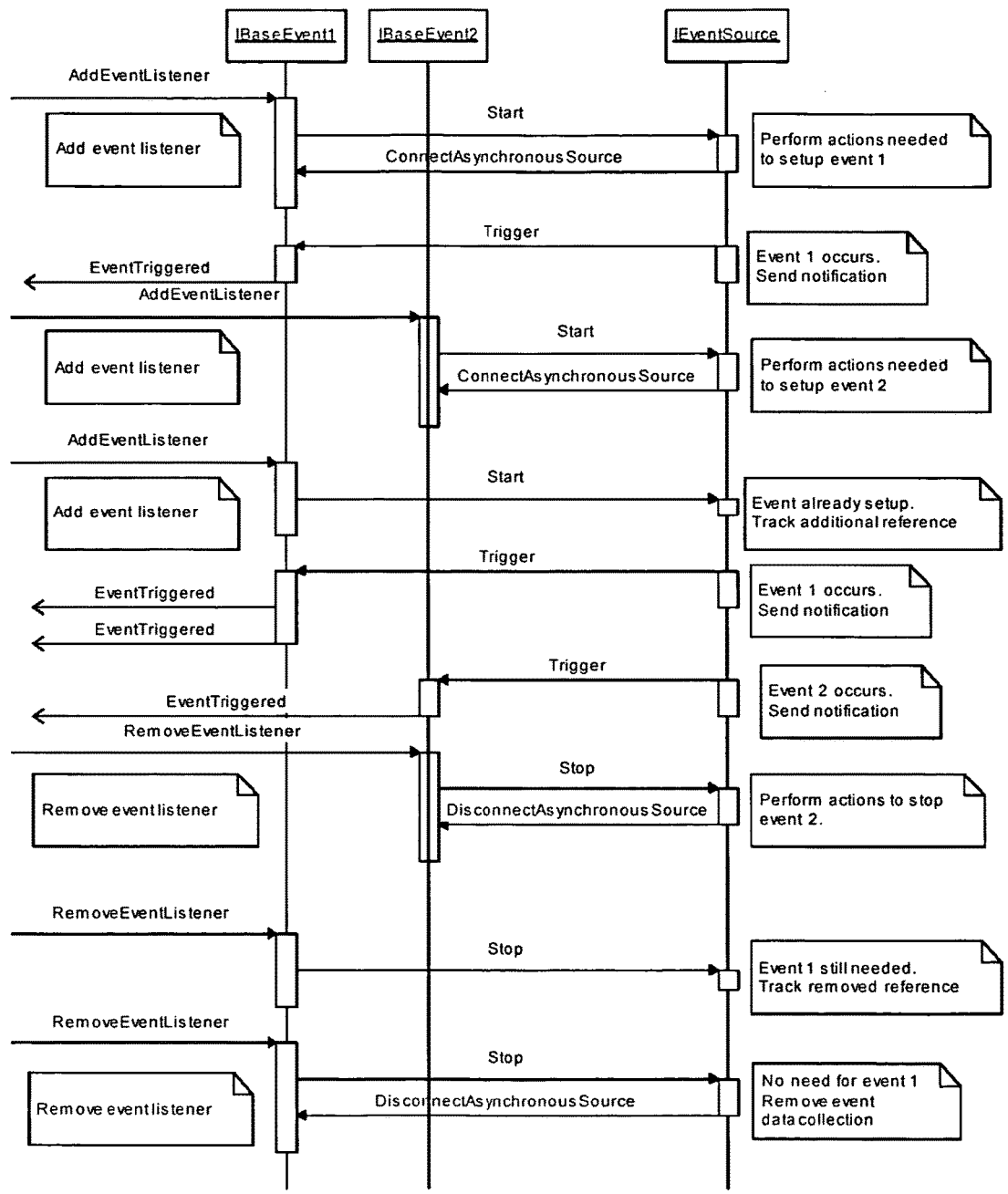
FIG. 24 illustrates communication between an event source and the equipment server in an embodiment of the present invention.

FIG. 24 illustrates an IEventSource that is not an IAsynchronousSource. This example shows the actions that occur as listeners are added to two different events that are both sourced by the IEventSource. The IEventSource must only track the number of references to each event so the source disconnects at the correct time.

Figure 25:
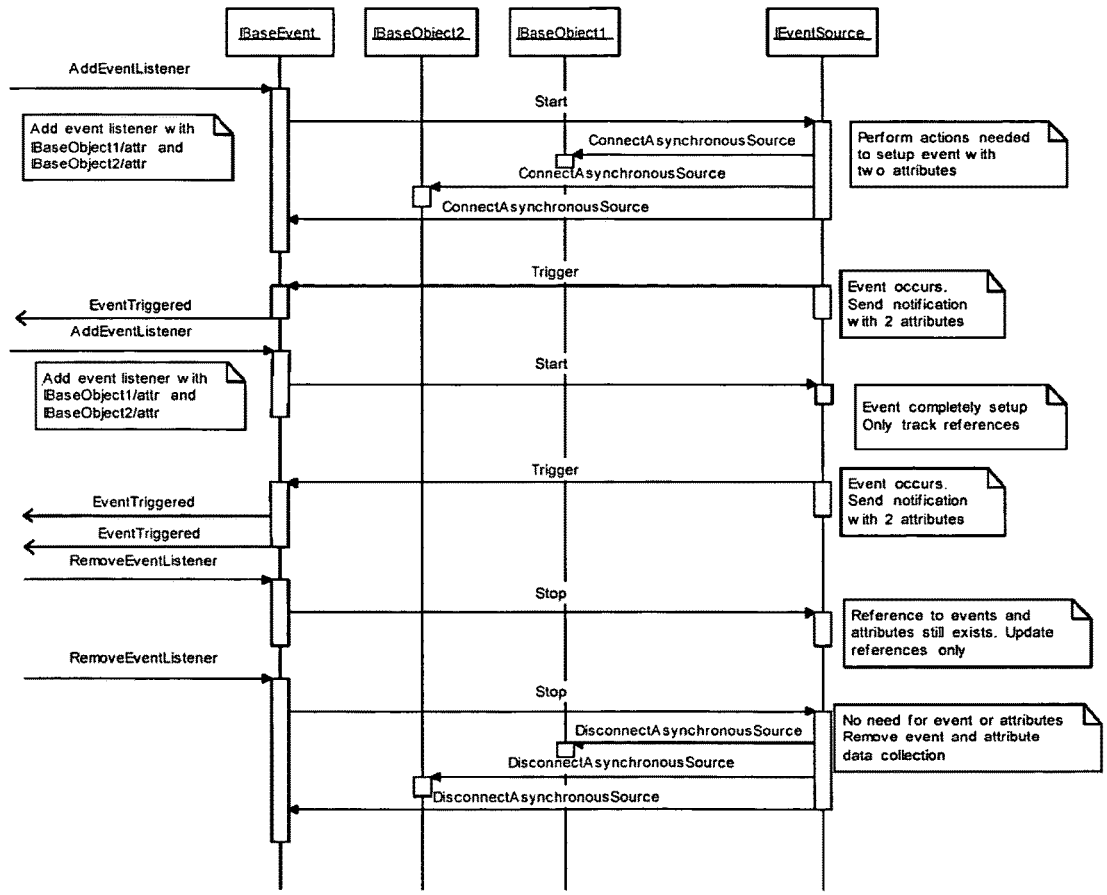
FIG. 25 illustrates communication between an event source and the equipment server in an embodiment of the present invention.
Figure 26:
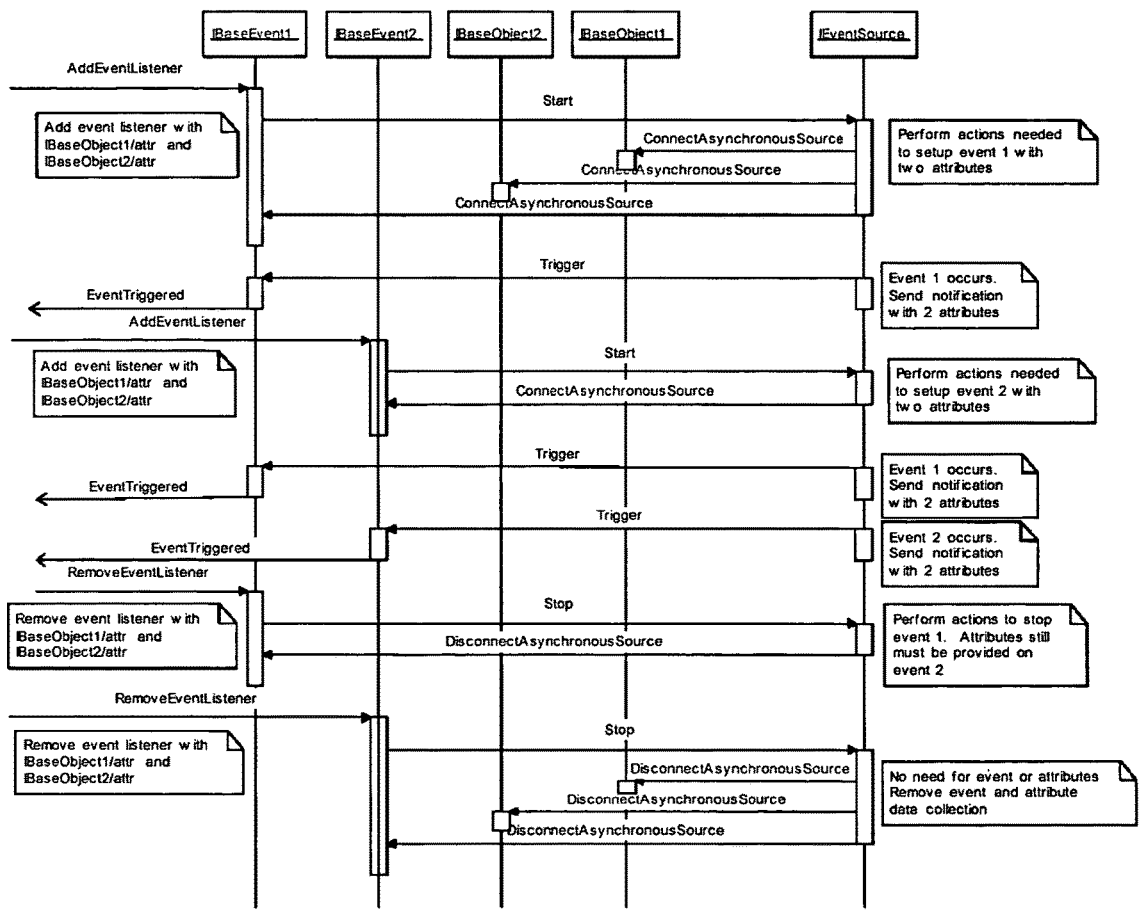
FIG. 26 illustrates communication between an event source and the equipment server in an embodiment of the present invention.

FIGS. 25 and 26 illustrate an IEventSource for one event that is an IAsynchronousSource for two attributes. This example shows the actions that occur as listeners are added to the event with the same attributes (FIG. 25) as well as with different attributes (FIG. 26). The IEventSource must now track the number of references to the event as well as to the attributes. At minimum, it must enable reporting of the attributes on each specific event as a listener is added (as is shown).

Figure 27:
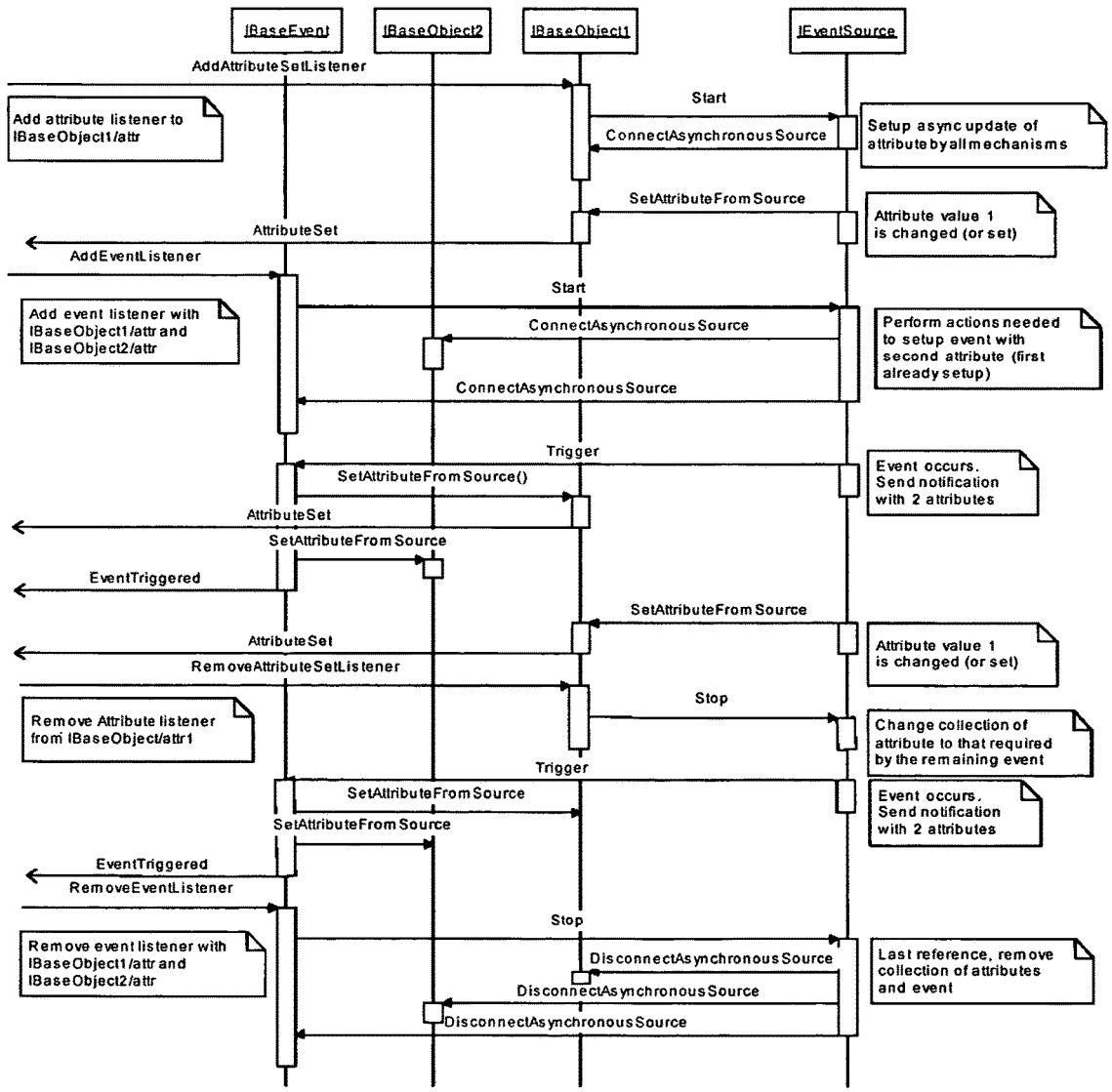
FIG. 27 illustrates communication between an event source and the equipment server in an embodiment of the present invention.

FIG. 27 illustrates an IEventSource for two events that is also an IAsynchronousSource for two attributes. This example shows the actions that occur as listeners are added to the event with the attributes.

Figure 28:
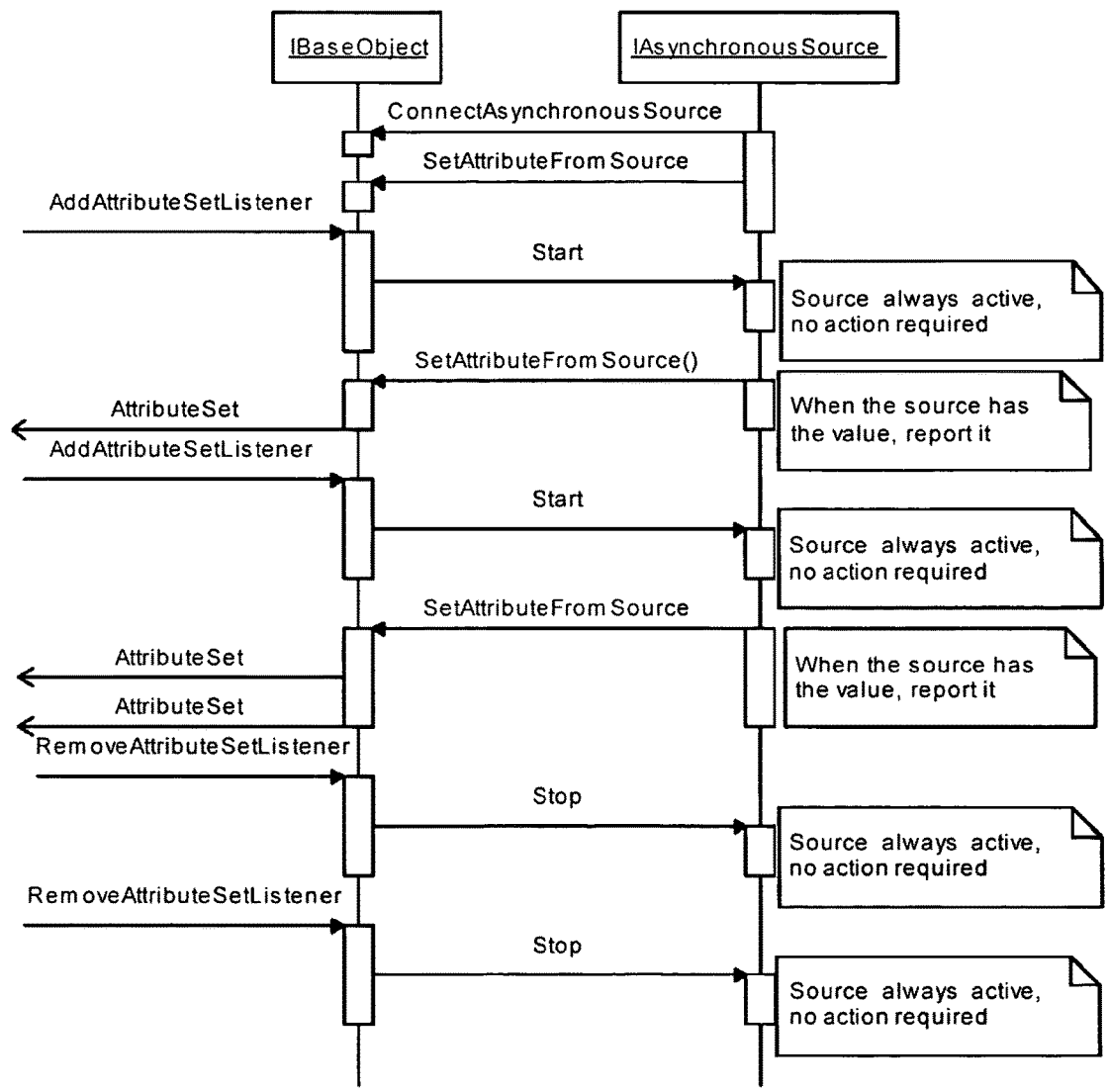
FIG. 28 illustrates communication between an event source and the equipment server in an embodiment of the present invention.

FIG. 28 illustrates what happens when an asynchronously supplied attribute is enabled followed by enabling an event that contains that attribute plus another. Note the additional action taken when the event is triggered on IBaseEvent to update the attribute. In reality, this is always done even when no attribute set listener exists. It was not shown in the previous diagrams because it was not relevant to the diagram.

Some asynchronous sources may continually provide the event regardless of interest in the event. These sources should call IBaseEvent.ConnectAsynchronousSource as soon as they are ready to begin supplying the event. If the source also supplies attributes, it must also call IBaseObject.ConnectAsynchronousSource for each attribute. The source may ignore the Start and Stop methods (These methods must still be implemented; they just will not perform any actions). At any time, if the source stops providing data, it must call IBaseEvent.DisconnectAsynchronousSource to inform the IBaseEvent that it is no longer supplying the event. If the object was also sourcing attributes, it must call IBaseObject.DisconnectAsynchronousSource on each attribute.

FIG. 29 illustrates the actions that must be taken by the source. Note that this drawing does not detail any of the actual actions taken within IBaseEvent or IBaseObject.

Updating as needed regardless of events is not as efficient mechanism of reporting the data but requires a simpler IEventSource. This system assumes that the real source of data is a separate application that must be communicated with. This system does not require that the IEventSource track the number of references to events or the data in the events. By not tracking this information, attributes must be updated by all events that may change the value of the attribute.

When a source client updates one or more events as needed by clients, IEventSource.Start will be called when the first listener is added to the event and IEventSource.Stop will be called when the last listener is removed from the event. Every time a call is made to Start, the source must perform all actions required to setup the collection of the event. If the event has a set of attributes that this source also updates, the source must perform all actions to configure collection of the data on this event plus all other events that have the ability to supply the attribute data. Once all actions have been completed successfully, call IBaseEvent.ConnectAsynchronousSource to notify the IBaseEvent that the source will begin supplying the event. Every time a call is made to Stop, the source must determine if the event is still needed. An event must remain enabled if the event supplies any attribute provided by this source that is currently enabled. If no attributes remain for the event, perform all actions necessary to terminate collecting the event along with the data associated with the event. Attributes will only be supplied with the Stop that are no longer needed by any listener. If the data is still collected on other events, it must continue to do so. Once all configuration is complete, it must call IBaseEvent.DisconnectAsynchronousSource to notify the IBaseEvent that the source will no longer supply the event.

FIG. 30 illustrates an IEventSource that is not an IAsynchronousSource. This example shows the actions that occur as listeners are added to two different events that are both sourced by the IEventSource.

FIGS. 31 and 32 illustrate an IEventSource for one event that is an IAsynchronousSource for two attributes. This example shows the actions that occur as listeners are added to the event with the same attributes (FIG. 31) as well as with different attributes (FIG. 32).

FIG. 33 illustrates an IEventSource for two events that is also an IAsynchronousSource for two attributes. This example shows the actions that occur as listeners are added to the event with the attributes. Note that both event sources must be enabled when a listener is added to the first event because both events will update the values of the attributes. In this example, the connect is only performed as needed.

FIG. 34 illustrates a slight variation on the example illustrated in FIG. 33, in which the sources for the events may be connected when the event is enabled on the external source.

FIG. 35 illustrates what happens when an asynchronously supplied attribute is enabled followed by enabling an event that contains that attribute plus another.

The previous figures describe calling Trigger on IBaseEvent. This method does not actually exist on IBaseEvent. It does exist on specific sub-classes of IBaseEvent. Not all events support triggering an event from an external asynchronous source. Some events have to be triggered by alternate means.

The present invention has been described above in connection with several embodiments. This has been done for purposes of illustration only, and variations of the inventions will be readily apparent to those skilled in the art and also fall within the scope of the invention.

The invention claimed is:

1. A multi-client multi-protocol equipment server for communicating with a tool which is a semiconductor manufacturing tool, comprising:

a plurality of host/client interfaces, at least one of said plurality of host/client interfaces for communicating with a manufacturing execution system;

a plurality of tool interfaces, at least one of said plurality of tool interfaces for communicating with the tool, wherein at least one of said plurality of tool interfaces is a Semi Equipment Communications Standard/Generic Model for Communications and Control of Manufacturing Equipment (SECS/GEM) interface; and an equipment object model of the tool, wherein the equipment object model is a hierarchical data model and is based at least in part on the Specification for the Common Equipment Model (CEM) promulgated by Semiconductor Equipment and Materials International (SEMI), wherein the equipment object model includes static attributes received from an XML document that configures the SECS/GEM interface, dynamic attributes received from the tool acting as a synchronous source that is registered through a class that implements an interface and that immediately transmits a value for a first attribute upon being queried and acting as an asynchronous source that transmits a value for a second attribute upon a change in the value, and dynamic attributes set from a host application, wherein the tool acts as a mutable synchronous source that is registered through a class that implements an interface and that receives a new value for a third attribute when the new value is set and transmits a value for the third attribute upon being queried, wherein one or more applications are provided access to the equipment object model of the tool, wherein at least one of said plurality of host/client interfaces is used to receive a query of what status the tool or its components are in, and wherein said equipment object model of the tool is used to respond to the query, via a synchronous data request to the tool acting as the synchronous source, to obtain the status of the tool or its components for response to the query, a user interface that allows the creation and editing of said equipment object model based on said object model definition, logic configured to, responsive to a command received through the user interface, validate said equipment object model of the tool against said object model definition, wherein validating said equipment object model includes determining whether said equipment object model adheres to the structure or format defined by the object model definition, and if so, then creating the equipment object model;

and wherein a computer executes the multi-client multi-protocol server.

2. The multi-client multi-protocol equipment server of claim 1, wherein at least one of said plurality of host/client interfaces is used for communicating with a tool performance application and wherein the tool performance application communicates with the tool based on said equipment object model of the tool.

3. The multi-client multi-protocol equipment server of claim 1, wherein at least one of said plurality of host/client interfaces is used for communicating with a spreadsheet application and wherein the spreadsheet application communicates with the tool based on said equipment object model of the tool.

4. The multi-client multi-protocol equipment server of claim 1, wherein at least one of said plurality of host/client interfaces is used for communicating with a Web browser-based remote diagnostics application and wherein the Web browser-based remote diagnostics application communicates with the tool based on said equipment object model of the tool.

5. The multi-client multi-protocol equipment server of claim 1, wherein a first one of said plurality of host/client interfaces is used for communicating with the manufacturing execution system, wherein a second one of said plurality of host/client interfaces is used for communicating with a second client, and wherein the manufacturing execution system communicates with the tool concurrently with the second client communicating with the tool, based on said equipment object model of the tool.

6. The multi-client multi-protocol equipment server of claim 1, wherein at least one of said plurality of host/client interfaces is used to receive a query of the physical or logical make-up of the tool, and wherein said equipment object model of the tool is used to respond to the query.

7. The multi-client multi-protocol equipment server of claim 1, wherein at least one of said plurality of host/client interfaces is used to communicate that an event associated with the tool has occurred, and wherein said equipment object model is used in the communication of the event, via asynchronous data collection from the tool acting as the asynchronous source to update an attribute indicating that the event has occurred.

8. The multi-client multi-protocol equipment server of claim 1, wherein at least one of said plurality of host/client interfaces comprises an interface based at least in part on the Generic Model for Communications and Control of Manufacturing Equipment (GEM) promulgated by Semiconductor Equipment and Materials International (SEMI) and wherein the manufacturing execution system communicates through said GEM interface.

9. The multi-client multi-protocol equipment server of claim 1, wherein the dynamic attributes received from the tool include an observable for temperature and an observable for maximum allowed pressure (MaxAllowedPressure).

10. The multi-client multi-protocol equipment server of claim 1, wherein at least one of said plurality of host/client interfaces comprises a .NET Framework interface, wherein the manufacturing execution system communicates through said .NET Framework interface.

11. The multi-client multi-protocol equipment server of claim 1, wherein at least one of said plurality of said tool interfaces comprises a .NET Framework interface, wherein the tool communicates through said .NET Framework interface.

12. The multi-client multi-protocol equipment server of claim 1, wherein the user interface is a graphical user interface.

13. A method for establishing communication between a tool which is a semiconductor manufacturing tool and a plurality of clients through a plurality of protocols, comprising the steps of:

configuring at least one of a plurality of host/client interfaces to communicate with a manufacturing execution system;

configuring at least one of a plurality of tool interfaces for communicating with the tool, wherein at least one of said plurality of tool interfaces is a Semi Equipment Communications Standard/Generic Model for Communications and Control of Manufacturing Equipment (SECS/GEM) interface; and defining an equipment object model of the tool, wherein said equipment object model is a hierarchical data model and is based at least in part on the Specification for the Common Equipment Model (CEM) promulgated by Semiconductor Equipment and Materials International (SEMI), wherein the equipment object model includes static attributes received from an XML document that configures the SECS/GEM interface, dynamic attributes received from the tool acting as a synchronous source that is registered through a class that implements an interface and that immediately transmits a value for a first attribute upon being queried and acting as an asynchronous source that is registered through a class that implements an interface and that transmits a value for a second attribute upon a change in the value, and dynamic attributes set from a host application, wherein the tool acts as a mutable synchronous source that receives a new value for a third attribute when the new value is set and transmits a value for the third attribute upon being queried, wherein one or more applications are provided access to the equipment object model of the tool, wherein at least one of said plurality of host/client interfaces is used to receive a query of what status the tool or its components are in, and wherein said equipment object model of the tool is used to respond to the query, via a synchronous data request to the tool acting as the synchronous source, to obtain the status of the tool or its components for response to the query, providing a user interface that allows the creation and editing of said equipment object model based on said object model definition, responsive to a command received through the user interface, validating said equipment object model of the tool against said object model definition, wherein validating said equipment object model includes determining whether said equipment object model adheres to the structure or format defined by the object model definition, and if so, then creating the equipment object model;

and wherein a computer executes each of the steps in the method.

14. The method for establishing communication of claim 13, further comprising the step of:

configuring at least one of said plurality of host/client interfaces to communicate with a tool performance application and wherein the tool performance application communicates with the tool based on said equipment object model of the tool.

15. The method for establishing communication of claim 13, further comprising the step of:
configuring at least one of said plurality of host/client interfaces to communicate with a spreadsheet application and wherein the spreadsheet application communicates with the tool based on said equipment object model of the tool.

16. The method for establishing communication of claim 13, further comprising the step of:
configuring at least one of said plurality of host/client interfaces to communicate with a Web browser-based remote diagnostics application and wherein the Web browser-based remote diagnostics application communicates with the tool based on said equipment object model of the tool.

17. The method for establishing communication of claim 13, further comprising the step of:
configuring at least one of said plurality of host/client interfaces to communicate with a second client, wherein the manufacturing execution system communicates with the tool concurrently with the second client communicating with the tool, based on said equipment object model of the tool.

18. The method for establishing communication of claim 13, wherein at least one of said plurality of host/client interfaces is used to receive a query of the physical or logical make-up of the tool, and wherein said equipment object model of the tool is used to respond to the query.

19. The method for establishing communication of claim 13, wherein at least one of said plurality of host/client interfaces is used to communicate that an event associated with the tool has occurred, and wherein said equipment object model is used in the communication of the event, via asynchronous data collection from the tool acting as the asynchronous source to update an attribute indicating that the event has occurred.

20. The method for establishing communication of claim 13, wherein at least one of said plurality of host/client interfaces comprises an interface based at least in part on the Generic Model for Communications and Control of Manufacturing Equipment (GEM) promulgated by Semiconductor Equipment and Materials International (SEMI) and wherein the manufacturing execution system communicates through said GEM interface.

21. The method for establishing communication of claim 13, the dynamic attributes received from the tool include an observable for temperature and an observable for maximum allowed pressure (MaxAllowedPressure).

22. The method for establishing communication of claim 13, wherein at least one of said plurality of host/client interfaces comprises a .NET Framework interface, wherein the manufacturing execution system communicates though said .NET interface.

23. The method for establishing communication of claim 13, wherein at least one of said plurality of said tool interfaces comprises a .NET Framework interface, wherein the tool communicates through said .NET Framework interface.

24. The method for establishing communication of claim 13, wherein the user interface is a graphical user interface.

25. A computer program product for use with an equipment server that incorporates an equipment object model of at least one tool which is a semiconductor manufacturing tool, comprising the computer program product having program instructions that, when executed by the equipment server, cause said equipment server to perform the following operations:
providing a graphical user interface; and
defining an object model definition, wherein said object model definition specifies the structure and format of an equipment object model of the tool, wherein said equipment object model is a hierarchical data model and is based at least in part on the Specification for the Common Equipment Model (CEM) promulgated by Semiconductor Equipment and Materials International (SEMI), wherein the equipment server includes a plurality of tool interfaces for communicating with the tool and at least one of said plurality of tool interfaces is a Semi Equipment Communications Standard/Generic Model for Communications and Control of Manufacturing Equipment (SECS/GEM) interface, wherein the equipment object model includes static attributes received from an XML document that configures the SECS/GEM interface, dynamic attributes received from the tool acting as a synchronous source that is registered through a class that implements an interface and that immediately transmits a value for a first attribute upon being queried and acting as an asynchronous source that transmits a value for a second attribute upon a change in the value, and dynamic attributes set from a host application, wherein the tool acts as a mutable synchronous source that is registered through a class that implements an interface and that receives a new value for a third attribute when the new value is set and transmits a value for the third attribute upon being queried,
wherein said graphical user interface allows the creation and editing of said equipment object model based on said object model definition,
responsive to a command received through the user interface, validating said equipment object model of the tool against said object model definition, wherein validating said equipment object model includes determining whether said equipment object model adheres to the structure or format defined by the object model definition, and if so, then creating the equipment object model;
and wherein the computer program product is stored in a non-transitory medium capable of being read by a computer.

26. The computer program product of claim 25, wherein said object model definition is an XML schema, formatted according to the XML schema definition language.

27. The computer program product of claim 25, wherein said equipment object model is generated in an XML file.

28. The computer program product of claim 25, wherein the user interface is a graphical user interface.

* * * * *